US009119172B2

(12) United States Patent
Ponukumati et al.

(10) Patent No.: US 9,119,172 B2
(45) Date of Patent: Aug. 25, 2015

(54) FAIR INSTANTANEOUS CONFLICT RESOLUTION AMONG N PERIODIC CONTENDERS

(71) Applicant: QUACLOMM Incorporated, San Diego, CA (US)

(72) Inventors: Dhananjaya Sarma Ponukumati, Hyderabad (IN); Jafar Mohseni, San Diego, CA (US); Reza Shahidi, San Diego, CA (US); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 13/955,335

(22) Filed: Jul. 31, 2013

(65) Prior Publication Data

US 2015/0038154 A1 Feb. 5, 2015

(51) Int. Cl.
*H04W 72/00* (2009.01)
*H04W 68/02* (2009.01)
*H04W 52/02* (2009.01)
*H04W 72/02* (2009.01)
*H04W 88/06* (2009.01)

(52) U.S. Cl.
CPC .......... *H04W 68/02* (2013.01); *H04W 52/0238* (2013.01); *H04W 72/02* (2013.01); *H04W 88/06* (2013.01)

(58) Field of Classification Search
CPC ..... H04W 24/00; H04W 68/00; H04W 36/30; H04B 1/3816
USPC ................... 455/452.1, 458, 558, 550.1, 436; 370/328, 338, 329, 330, 331
See application file for complete search history.

(56) References Cited

U.S. PATENT DOCUMENTS

| 8,170,616 | B2 | 5/2012 | Lee |
| 8,175,621 | B2* | 5/2012 | Hsu ............................. 455/458 |
| 8,204,516 | B2 | 6/2012 | Hsu |
| 8,244,301 | B2 | 8/2012 | Shi |
| 8,290,518 | B2 | 10/2012 | Fang et al. |
| 2011/0217969 | A1* | 9/2011 | Spartz et al. ............... 455/422.1 |
| 2012/0231802 | A1 | 9/2012 | Ngai |
| 2012/0275380 | A1* | 11/2012 | Chin et al. .................... 370/328 |

FOREIGN PATENT DOCUMENTS

EP 2432288 A1 * 3/2012
EP 2466970 A1 * 6/2012

(Continued)

OTHER PUBLICATIONS

International Search Report and Written Opinion—PCT/US2014/048463—ISA/EPO—Feb. 2, 2015.

*Primary Examiner* — Babar Sarwar
(74) *Attorney, Agent, or Firm* — The Marbury Law Group, PLLC

(57) ABSTRACT

The various embodiments include methods for managing how a multi-SIM-multi-standby (MSMS) communication device that is accessing an arbitrary combination of multiple telephony networks processes paging collisions. The embodiment methods promote the control of the paging block rates for two or more subscriptions, in which a subscription's paging block rate is the subscription's number of blocked pages during a certain time multiplied by the subscription's discontinuous reception cycle. In the various embodiments, an MSMS communication device may implement a fair paging conflict resolution algorithm to keep each subscription's paging block rate approximately equal over time.

40 Claims, 11 Drawing Sheets

(56) References Cited

FOREIGN PATENT DOCUMENTS

| EP | 2605559 | A1 | * | 6/2013 |
|---|---|---|---|---|
| WO | 2012/079962 | A1 | | 6/2012 |
| WO | WO 2012079963 | A1 | * | 6/2012 |
| WO | 2012106664 | | | 8/2012 |
| WO | WO 2012106664 | A1 | * | 8/2012 |
| WO | 2013/014000 | A1 | | 1/2013 |
| WO | WO 2013014000 | A1 | * | 1/2013 |

* cited by examiner

FAIR INSTANTANEOUS CONFLICT RESOLUTION AMONG N PERIODIC CONTENDERS

BACKGROUND

Some new designs of mobile communication devices—such as smart phones, tablet computers, and laptop computers—contain multiple Subscriber Identity Module (SIM) cards that provide users with access to multiple separate mobile telephony networks. Examples of mobile telephony networks include GSM, TDSCDMA, CDMA2000, and WCDMA. Example multi-SIM mobile communication devices include mobile phones, laptop computers, smart phones, and other mobile communication devices that are enabled to connect to multiple mobile telephony networks. A mobile communication device that includes a plurality of SIM cards that share radio frequency (RF) resources for communicating with their respective mobile telephony networks and connects to multiple separate mobile telephony networks is termed a "multi-SIM-multi-standby communication device" or a "MSMS communication device."

A MSMS communication device may include one or more RF resources that the multiple subscriptions use to communicate with their respective mobile telephony networks. Only one subscription may use each RF resource to communicate with its mobile network at a time. However, even when a subscription is in "standby" mode, meaning it is not currently actively communicating with the network, it may still need to perform discontinuous reception (DRX) operations to receive network paging messages at regular intervals (i.e., a discontinuous reception period) in order to remain connected to the network. Paging intervals for different subscriptions are not necessarily the same nor are they synchronized. Therefore, it is possible that at a certain times, the multiple subscriptions sharing an RF resource may need to use the RF resource to communicate with their respective mobile networks simultaneously. For example, two subscriptions out of three or more subscriptions may try to use a single RF resource to receive their paging messages simultaneously, or one subscription may be using the RF frontend when the other subscription receives a network paging message.

A "paging collision" occurs when page reception times of two or more subscriptions overlap, as happens when the network paging messages for multiple subscriptions are scheduled at the same time. When a paging collision occurs, one subscription must be assigned the RF resource to the exclusion of the other subscriptions. In other words, one subscription may block the other subscriptions from communicating with their respective networks (i.e., not receive their schedule page messages). Currently, the paging DRX cycle length (i.e., the length of time from the beginning of one network paging session to the next) for each subscription is determined entirely by the network and occurs in regular, predictable intervals. MSMS communication devices cannot manipulate or reschedule the paging DRX cycle for the multiple subscriptions and, therefore, cannot prevent paging collisions from occurring between the multiple subscriptions even though paging collisions can be anticipated.

SUMMARY

The various embodiments include methods for managing how an MSMS communication device that is accessing an arbitrary combination of multiple telephony networks processes paging collisions. The embodiment methods promote the control of the paging block rates ("PBR") for a plurality of subscriptions operating on the MSMS communication device, in which a subscription's paging block rate is the subscription's number of blocked pages during a certain time multiplied by the subscription's discontinuous reception (DRX) cycle. In various embodiments, an MSMS communication device may implement a fair paging conflict resolution algorithm in response to expected paging collisions to keep each subscription's PBR approximately equal over time.

In an embodiment, the MSMS communication device may perform fair paging conflict resolution based on the PBR values of colliding subscriptions. In this embodiment, the MSMS communication device may rank the colliding subscriptions based on their respective PBR values and may choose one or more colliding subscriptions with the highest PBR values to receive one or more shared RF resources.

In another embodiment, the MSMS communication device may perform fair paging conflict resolution based on the PBR values and the priority values of the colliding subscriptions. The MSMS communication device may maintain a priority value for each of the plurality of subscription, wherein the priority value may be an indication (e.g., a Boolean value, "0" or "1") of whether a subscription was chosen to receive access to a shared RF resource during the last paging collision in which it participated. Thus, the MSMS communication device may choose one or more of the colliding subscriptions with the highest priority values and the highest PBR values, thereby decreasing the likelihood that a subscription will be consecutively blocked from receiving a shared RF resource.

In another embodiment, the MSMS communication device may choose one or more of the colliding subscriptions to receive a shared RF resource based on the colliding subscriptions' PBR values and their weighted priority values. In an embodiment, a weighted priority value may be the weighted sum of various parameters (other than PBR values), such as the channel quality for each of the colliding subscriptions. The MSMS communication device may use the colliding subscriptions' weighted priority values and PBR to rank the colliding subscriptions, and the MSMS communication device may choose one or more of the colliding subscriptions to receive a shared RF resource based on that ranking.

In yet another embodiment, the MSMS communication device may choose one or more of the colliding subscriptions to receive a shared RF resource based on a calculated ranking based at least in part on the colliding subscriptions' PBR values. For example, the MSMS communication device may calculate which colliding subscriptions' PBR values are closest to a calculated variance value of the colliding subscriptions' PBR values and may rank colliding subscriptions based on how close they are to the variance value.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
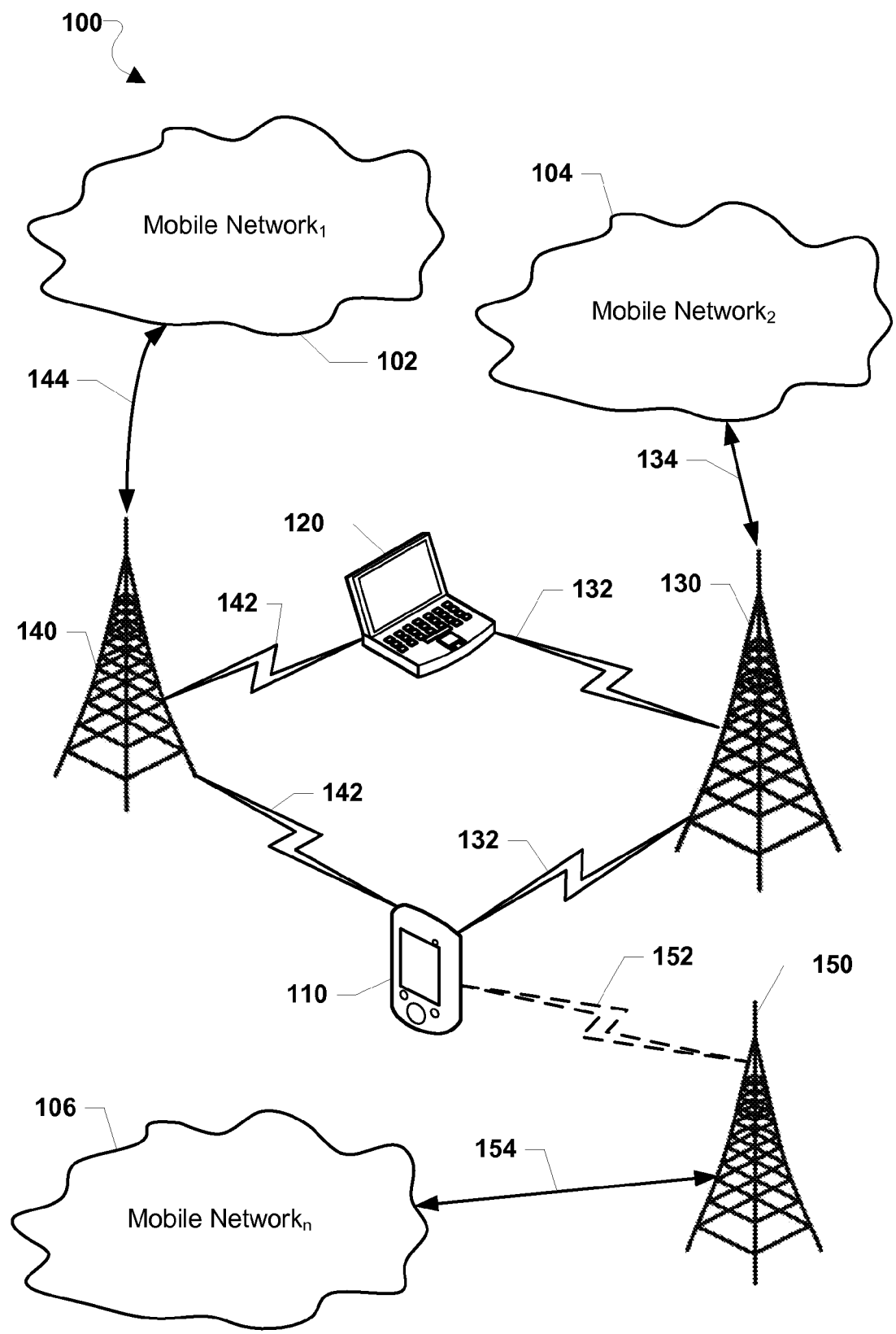
FIG. 1 is a communication system block diagram of mobile telephony networks suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "MSMS communication device" refers to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which individually include a programmable processor and memory and circuitry for connecting to at least two mobile communication networks. The various aspects may be useful in mobile communication devices, such as smart phones, and so such devices are referred to in the descriptions of the various embodiments. However, the embodiments may be useful in any electronic devices that may individually maintain a plurality of subscriptions to a plurality of mobile networks through one or more radio transceivers (i.e., one or more shared RF resources).

In overview, the various embodiments describe methods for managing how an MSMS communication device processes paging collisions among subscriptions to an arbitrary number of mobile telephony networks. The embodiment methods promote the control of the paging block rates ("PBRs") for the multiple distinct subscriptions, in which a subscription's PBR is the long-term ratio of the number of its blocked paging messages over its total number of requested paging messages. In the various embodiments, the MSMS communication device may implement a conflict resolution algorithm to achieve approximately equal PBRs among the multiple colliding subscriptions. Thus, the various embodiments may increase the performance of the multiple colliding subscriptions operating on the MSMS communication device and enhance the user's overall experience.

Currently, MSMS communication devices are capable of predicting future paging collisions and waking up a subscription only when that subscription will be able to utilize the shared RF resource to complete paging communications with its mobile network. In the various embodiments, the MSMS communication device may leverage its ability to predict future paging collisions (i.e., wake up a subscription only when it will receive the shared RF resource) to efficiently achieve an approximately equal page blocking rate for each of the multiple subscriptions operating on the MSMS communication device. For example, the MSMS communication device may preemptively detect a paging collision during a future paging session, implement the conflict resolution algorithm to select a subscription to receive the shared RF resource during the future paging session, and wake up only the selected subscription before the future paging session.

In the various methods, an MSMS communication device may rely on several equations to ensure that the subscriptions' PBRs will be approximately equal over time. The PBR for an arbitrary subscription (subscription$_i$) may be described in the following equation:

$$PBR_i = \frac{b_i}{\frac{t}{T_i}}$$

wherein the PBR of subscription$_i$ (i.e., PBR$_i$) is equal to the number of subscription$_i$'s blocked pages (i.e., b$_i$) during a given duration of time t, divided by the quotient of t and the DRX cycle length of subscription$_i$ (i.e., the DRX variable T$_i$).

Thus, in order to maintain equal PBRs for multiple subscriptions operating on the MSMS communication device (i.e., subscription$_1$ through subscription$_n$), the MSMS communication device may enforce PBR equality at every time t, as illustrated by the following equation:

$$b_1{}^*T_1 = b_2{}^*T_2 = \ldots = b_i{}^*T_i = \ldots = b_n T_n$$

wherein b$_i$*T$_1$=PBR$_i$ for any subscription. The MSMS communication device may maintain each subscription's number of blocked pages (i.e., the subscription's b value) and each subscription's DRX cycle length (i.e., the subscription's T value).

In one embodiment, the MSMS communication device may perform paging collision conflict resolution by determining whether one subscription's PBR is larger than the other subscription's PBR. When a collision occurs, the MSMS communication device may assign the RF resource to the subscription that has a larger PBR value. The MSMS communication device may also increment the losing subscription's b value by one. In another embodiment, the MSMS communication device may reset all b values whenever a T value changes, such as when a subscription's mobile network changes the DRX cycle length or when the MSMS communication device is powered down/up.

In a further embodiment, the MSMS communication device may select m of n conflicting subscriptions to receive m resources, wherein m≤n. In this embodiment, rather than selecting only one subscription to receive the shared RF resource based on its PBR value, the MSMS communication device may rank the colliding subscriptions from highest to lowest PBR and select the m colliding subscriptions that have the highest PBR values to receive one of the m shared RF resources. The MSMS communication device may then increment the b values for the colliding subscriptions that do not receive a shared RF resource.

In another embodiment, the MSMS communication device may perform paging collision conflict resolution based in part on the results of previous paging collision arbitration results. In this embodiment, the MSMS communication device may keep track of each subscription's last paging collision result (herein referred to by the priority variable P). A subscription's P value may be a Boolean value (i.e., 0 or 1) that indicates whether the subscription prevailed in its last paging collisions arbitration (e.g., a P value of one) or not (e.g., a P value of zero), and in various embodiments, a P value of one may indicate a higher priority than a P value of zero.

Accordingly, in an embodiment, the MSMS communication device may select m of n contenders, wherein m≤n, to receive access to m resources based on the subscriptions' P values and PBR values. In this embodiment, the MSMS communication device may rank the subscriptions first by P value and then from highest to lowest PBR value. The MSMS communication device may select the m colliding subscriptions that have the highest priority and PBR values. The MSMS communication device may then increment the b values by one and set the P values to one for the subscriptions that do not receive access to the multiple shared RF resources and may reset the P values to zero for the subscriptions that do receive access to the RF resources.

In further embodiments, the MSMS communication device may implement other priority schemes that include various other characteristics of the colliding subscriptions. In such embodiments, the MSMS communication device may select m contenders out of n total contenders based in part on the colliding subscriptions' respective weighted priority values (i.e., C values). A weighted priority value may be the weighted sum of various parameters (other than PBR values) and may be used when ranking the colliding subscriptions. For example, a colliding subscription's weighted priority value may be the sum of its current channel quality multiplied by 0.4 and its paging duration multiplied by 0.6. Thus, the MSMS communication device may use the colliding subscriptions' weighted priority values in addition to their PBR values when determining the colliding subscriptions that will receive access to a shared RF resource.

In another embodiment, the MSMS communication device may rank the colliding subscriptions' PBR values based on criteria other than the magnitude of each colliding subscription's PBR value. In other words, the MSMS communication device may not rank the PBR values from greatest to least, but may instead rank the colliding subscriptions using other ranking criteria, such as how close their PBR values are to a calculated variance value. By implementing various PBR ranking criteria, the MSMS communication device may have a greater flexibility when determining the subscriptions that will be assigning a shared RF resource.

The various embodiments may be implemented within a variety of communication systems 100, such as two or more mobile telephony networks 102, 104, 106, an example of which is illustrated in FIG. 1. Mobile networks 102, 104, 106 are typical mobile networks that include a plurality of cellular base stations 130, 140, 150. A first MSMS communication device 110 may be in communication with a first mobile network 102 through a cellular connection 142 to a first base station 140, which may be in communication with the first mobile network 102 via a wired connection 144. The first MSMS communication device 110 may also be in communication with the second mobile network 104 through a cellular connection 132 to a second base station 130, which may be in communication with the second mobile network 104 through a wired connection 134. A second MSMS communication device 120 may similarly communicate with the first mobile network 102 through a cellular connection 142 to a first base station 140. The second mobile communication device 120 may also communicate with the second mobile network 104 through a cellular connection 132 to the second base station 130.

In a further embodiment, the first MSMS communication device 110 may optionally connection to n other mobile networks. For example, the first MSMS communication device 110 may optionally connect to a third mobile network 106 through an optional cellular connection 152 to a base station 150, which may connect to the third mobile network 106 through a wired connection 154. While the second MSMS communication device 120 is not shown connected to the third mobile network 106, it is anticipated that any MSMS communication device may connect to an arbitrary number of mobile networks.

Cellular connections 132, 142, 152 may be made through two-way wireless communication links, such as 4G, 3G, CDMA, TDMA, WCDMA, GSM, and other mobile telephony communication technologies.

Figure 2:
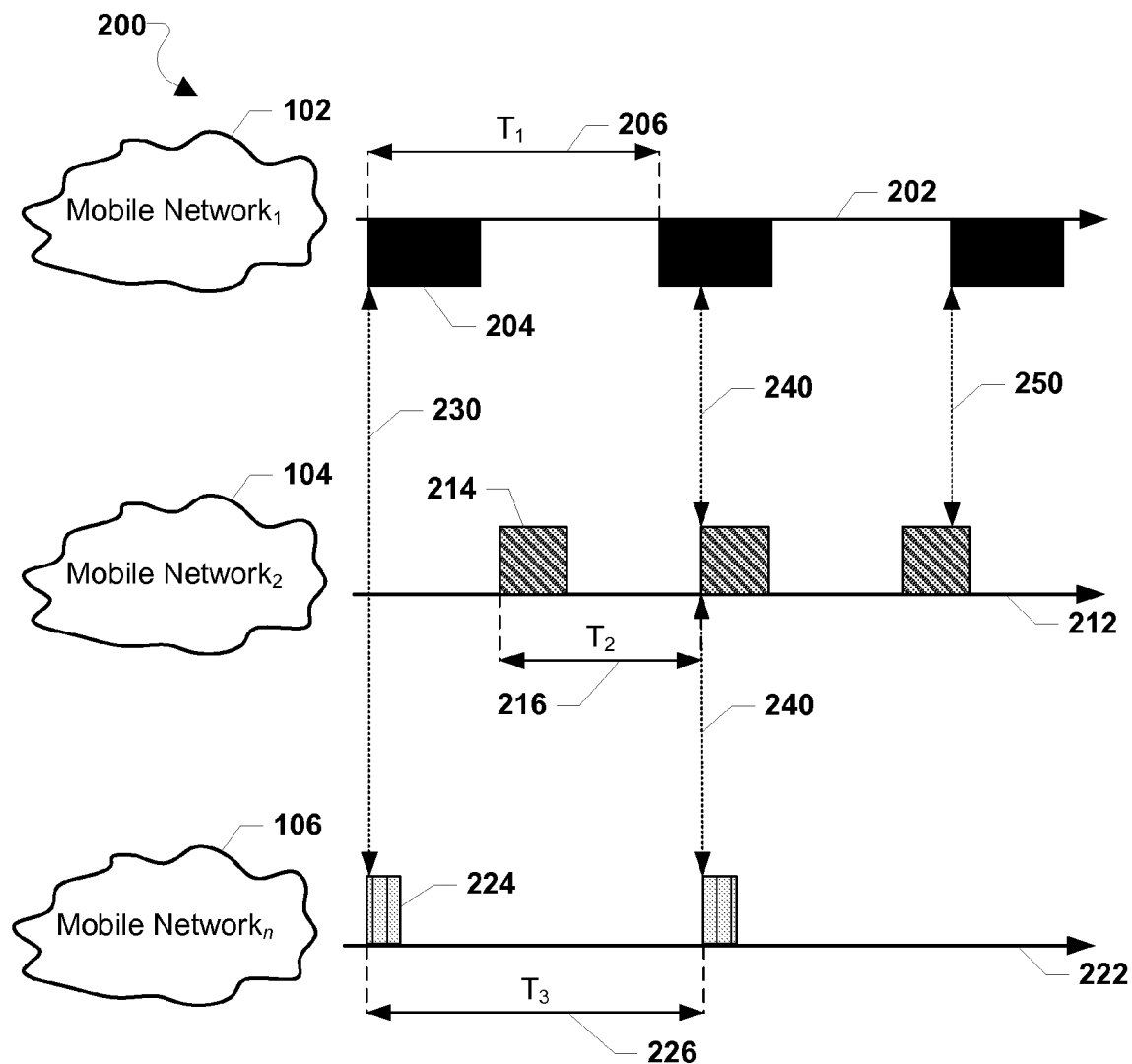
FIG. 2 is a time-line diagram illustrating discontinuous reception of paging messages on multiple mobile networks.

FIG. 2 illustrates a timeline diagram 200 that demonstrates an example of paging collisions between multiple embodiment subscriptions operating on an MSMS communication device 110.

In this example, a first subscription 202 on a first mobile network 102 may have a DRX cycle length 206 equal to $T_1$. The first subscription 202 may also have a paging session duration 204, during which the first subscription 202 may receive and respond to pages sent from the first mobile network 102. Similarly, a second subscription 212 to a second mobile network 104 may have a DRX cycle length 216 equal to $T_2$ and may complete paging communications with the second mobile network 104 during a second paging session duration 214. Additionally, a third subscription 222 to the third mobile network 160 may have a DRX cycle length 226 equal to $T_3$ and may complete paging communications with a third mobile network 106 during a third paging session 224.

Because of the different DRX cycle lengths 206, 216, 226 of the subscriptions 202, 212, 222, respectively, various combinations of paging collisions 230, 240, 250 may occur. As discussed above, a paging collision 230, 240, 250 occurs when two or more subscriptions are attempting to use a shared RF resource simultaneously, such as when a subscription's paging session overlaps with another subscription's paging session. For example, the first subscription 202 may receive a paging message during the second subscription 212's paging session 214 (i.e., paging collision 250) or during the third subscription 222's paging session 224 (i.e., paging collision 230). A paging collision may also occur among more than two subscriptions, as is illustrated by paging collision 240, which is a paging collision among the first, second, and third subscriptions 202, 212, 222.

In an embodiment, the MSMS communication device may receive paging messages sequentially, meaning that paging collisions are detected sequentially. For example, in response to detecting a paging collision 240, the MSMS communication device may respectively receive a paging message for each of the first subscription 202, second subscription 212, and the third subscription 222. Thus, the MSMS communication device may arbitrate the collision among multiple subscriptions sequentially (e.g., performing a first paging collision arbitration between the first subscription 202 and the second subscription 212 and then performing a second collision arbitration between the prevailing subscription of the first arbitration and the third subscription 222).

Figure 3:
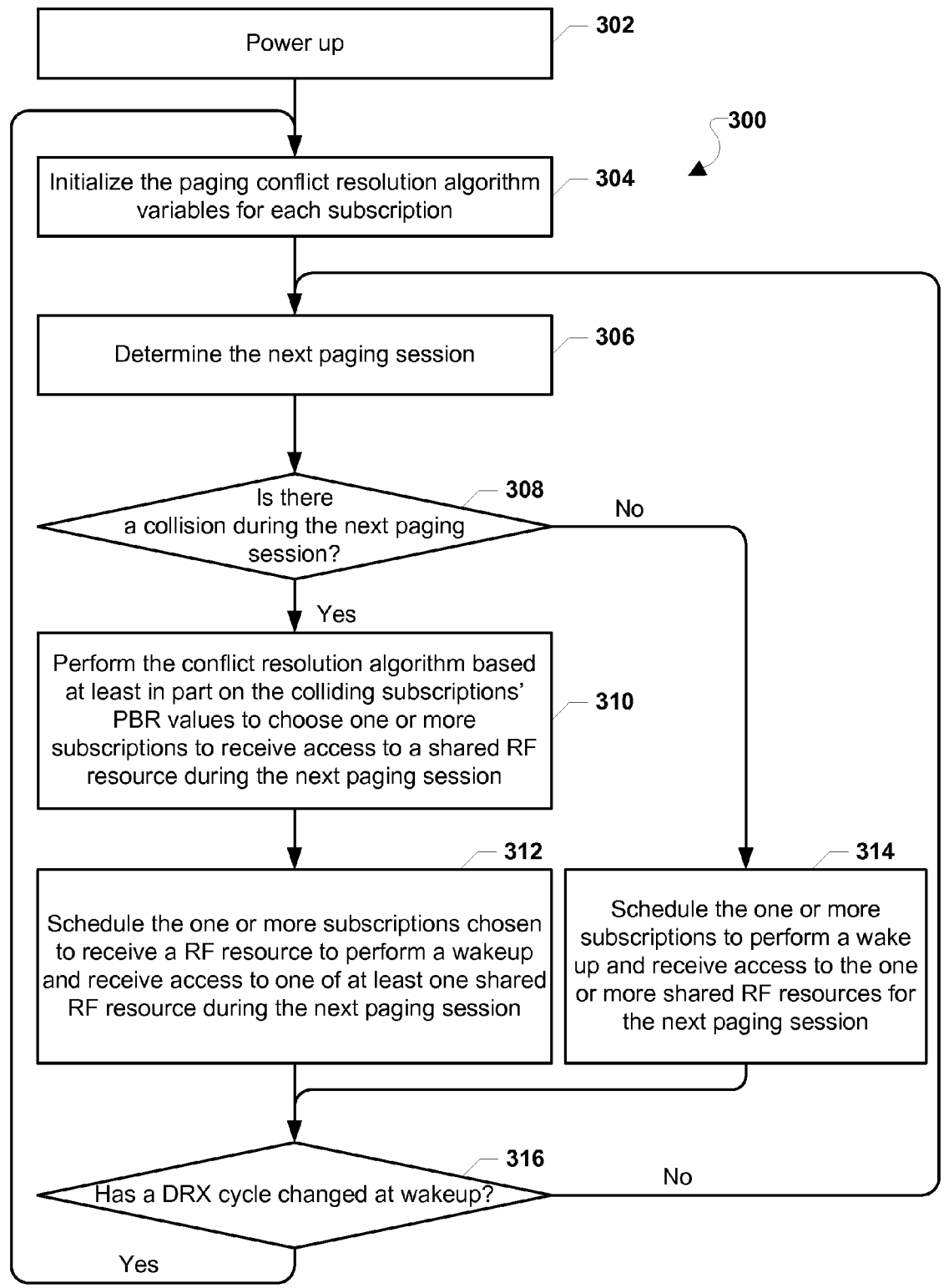
FIG. 3 is a process flow diagram illustrating an embodiment method for implementing a fair paging conflict resolution algorithm among multiple subscriptions.

FIG. 3 illustrates an embodiment method 300 that may be implemented in an MSMS communication device for implementing a fair paging conflict resolution among multiple subscriptions. The MSMS communication device may power up in block 302.

In block 304, the MSMS communication device may initialize the paging conflict resolution algorithm variables for each subscription. The paging conflict resolution algorithms variables may include information specific to each subscription operating on the MSMS communication device. Embodiment methods for initializing paging conflict resolution algorithm variables are discussed in further detail with reference to FIGS. 4 and 5.

In block 306, the MSMS communication device may determine the next paging session. In an embodiment, the MSMS communication device may determine the DRX cycles for each subscription and determine when the next paging session will occur.

The MSMS communication device may also determine whether a paging collision will occur during the next paging session in determination block 308. In an embodiment, the MSMS communication device may keep track of each subscription's DRX cycle and may be able to predict whether two or more subscriptions will collide at the next paging session. In other words, the MSMS communication device may preemptively assess whether a paging collision will occur at a particular time in the future.

If the MSMS communication device determines that there will be no collision at the next paging session (i.e., determination block 308="No"), the MSMS communication device may schedule one or more subscriptions to perform a wakeup to receive access to the one or more shared RF resources for the next paging session in block 314. In this case when there are no paging collisions, the MSMS communication device may assign a shared RF resource to each subscription performing paging communications during the next paging session, meaning that no subscription will be blocked from completing its paging communications. The MSMS communication device may continue performing in determination block 316.

However, if the MSMS communication device determines that a paging collision will occur during the next paging session (i.e., determination block 308="Yes"), the MSMS communication device may perform the conflict resolution algorithm in block 310 based at least in part on the colliding subscriptions' PBR values to choose one or more subscriptions to receive access to a shared RF resource during the next paging session. Embodiment methods for performing the conflict resolution algorithm are discussed in further detail below with reference to FIGS. 6A-6B, 7A-7B, 8, and 9.

In block 312, the MSMS communication device may schedule the one or more chosen subscriptions in block 310 to perform a wakeup and receive access to one of at least one shared RF resource during the next paging session. In an embodiment, the MSMS communication device may leverage its ability to predict paging collisions to schedule wake-ups only for subscriptions that are chosen to receive a shared RF resource. The MSMS communication device may not schedule wakeups for the subscriptions that are not chosen (i.e., the blocked subscriptions), thereby preventing the blocked subscriptions from performing unnecessary wakeup routines. In another embodiment, the MSMS communication device may enable the one or more chosen subscriptions to receive the shared RF resources. In this embodiment, the MSMS communication device may enable the one or more chosen subscriptions to each receive the shared RF resources by using various mechanisms, such as switches, flags, schedulers, etc. The MSMS communication device may continue operating in determination block 316.

In determination block 316, the MSMS communication device may determine whether a DRX cycle has changed for any of the subscriptions. The DRX cycle may change for various reasons, including when a subscription's reselects to a new cell or when a current mobile network changes the DRX cycle for one or more subscriptions. In an embodiment, the MSMS communication device may determine whether a DRX cycle has changed by monitoring for a persistent change to any subscription's paging pattern.

If a DRX cycle has changed (i.e., determination block 316="Yes"), the MSMS communication device may continue operating in block 304. In an embodiment, the MSMS communication device may reinitialize the paging conflict resolution algorithm variables for each subscription in response to determining that a DRX cycle has changed. By reinitializing these variables, the MSMS communication device may ensure that paging conflict resolution algorithm reflects changes to a subscription's DRX cycle, which otherwise may cause spurious results. For example, if a mobile network halves the DRX cycle for a particular subscription and the MSMS communication device does not reinitialize the paging conflict resolution algorithm variables for each subscription, that subscription may disproportionally receive access to a shared RF resource when paging conflicts occur.

If a DRX cycle has not changed (i.e., determination block 316="No"), the MSMS communication device may continue operating in 306. In an embodiment, the MSMS communication device may repeat the process of determining whether a paging collision will occur at a next paging session and performing the paging conflict resolution algorithm when such a collision occurs.

Figure 4:
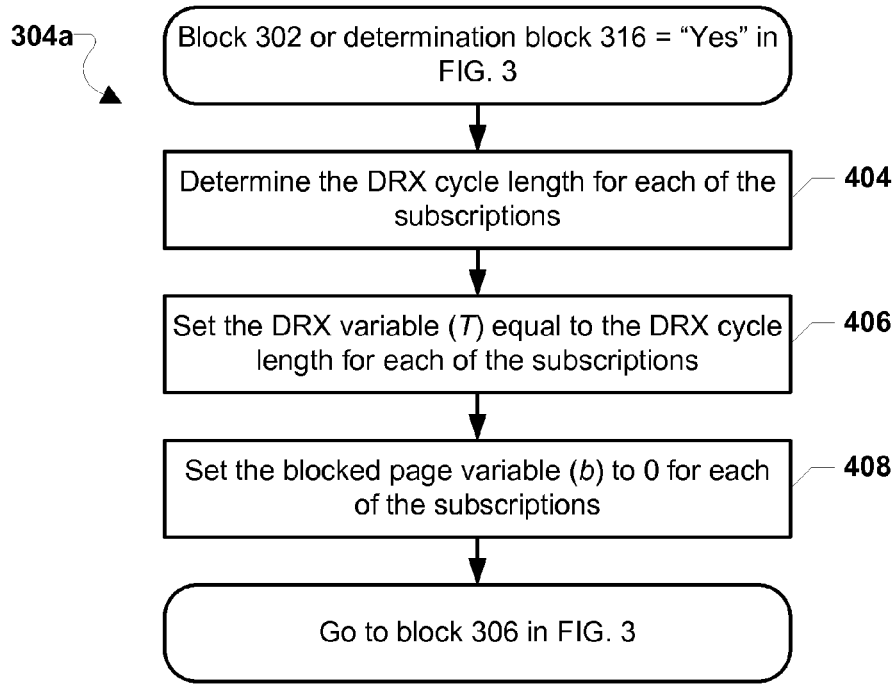
FIG. 4 is a process flow diagram illustrating an embodiment method for initializing a subscription's paging conflict algorithm variables.
Figure 5:
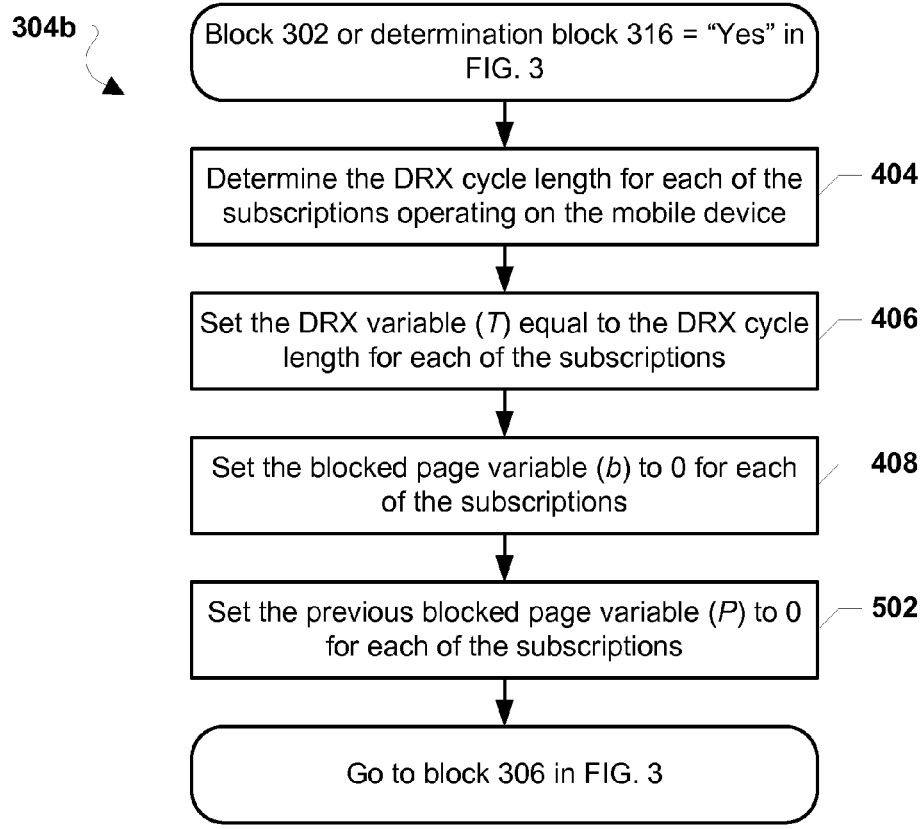
FIG. 5 is a process flow diagram illustrating another embodiment method for initializing a subscription's paging conflict algorithm variables.

FIGS. 4-5 illustrate embodiment methods that may be implemented in an MSMS communication device for initializing the paging conflict resolution algorithm variable for each subscription as discussed with reference to block 304 in FIG. 3. In the various embodiments, the MSMS communication device may set or initialize a number of variables associated with each subscription operating on the MSMS communication device. The MSMS communication device may use these variables when performing paging collision arbitration. Because the paging conflict resolution algorithm causes each subscription's page block rate to be approximately equal when averaged over time, the MSMS communication device may also continually update and store the variables associated with each subscription to ensure consist long-term performance.

The term "initialize" herein indicates an initial instance in which the MSMS communication device sets the paging conflict resolution algorithm variables. Additionally, the term "reinitialize" herein indicates a subsequent instance in which the MSMS communication device sets the paging conflict resolution algorithm variables. While different terms are used depending on when the MSMS communication device sets the variables, in the various embodiments, the MSMS communication device may perform the same operations to set the variables regardless of whether the MSMS communication device is "initializing" the variables or "reinitializing" the variables.

FIG. 4 illustrates an embodiment method 304a that may be implemented in an MSMS communication device for initializing a subscription's paging conflict algorithm variables. The MSMS communication device may begin performing method 304a by transitioning from one of block 302 and determination block 316 when determination block 316="Yes" in FIG. 3.

In block 404, the MSMS communication device may determine the DRX cycle length for each of the subscriptions. In an embodiment, the MSMS communication device may monitor each subscription's paging activities for a sufficient amount of time to discover that subscription's paging pattern. For example, because the paging pattern is periodic and predictable, the MSMS communication device may determine a subscription's DRX cycle length by measuring the time between receiving a paging request and receiving a subsequent paging request. In another example, the MSMS communication device may receive the DRX cycle length directly from a subscription's mobile network.

In block 406, for each subscription, the MSMS communication device may set the subscription's DRX variable (i.e., T) equal to the determined DRX cycle length for that subscription. In other words, the MSMS communication device may determine a subscription's DRX cycle length and store that length as a T variable associated with the subscription in, for example, a table maintained in memory.

Similarly, in block 408, the MSMS communication device may set each subscription's blocked page variable (i.e., b) to zero. In an embodiment, the MSMS communication device may set a subscription's b value to zero initially and increment the b value to affect the subscription's likelihood of receiving a shared RF resource when it is a participant in a paging collision.

The MSMS communication device may continue operating in block 306 in FIG. 3 by determining the next paging session.

FIG. 5 illustrates another embodiment method 304b that may be implemented in an MSMS communication device for initializing a subscription's paging conflict algorithm variables. The MSMS communication device may generally perform the operating discussed above with reference to FIG. 4 but may include additional operations. The MSMS communication device may begin performing method 304b by transiting from one of block 302 or determination block 316 when determination block 316="Yes" in FIG. 3.

As discussed above with reference to block 404 in FIG. 4, the MSMS communication device may determine the DRX cycle length for each of the subscriptions in block 404. The MSMS communication device may perform these actions, for example, by measuring the time between each subscription's paging messages.

In block 406, the MSMS communication device may set each subscription's DRX cycle length (i.e., T variable) equal to its respective DRX cycle length as the MSMS communication device determined in block 404. The MSMS communication device may also set each subscription's b value to zero in block 408.

In block 502, the MSMS communication device may set the priority variable (P) to zero for each of the subscriptions. In an embodiment, the MSMS communication device may use the P value to indicate (i.e., 1 or 0) whether a particular subscription has a higher priority because its last page message was blocked as discussed below with reference to FIGS. 7A-7B. The MSMS communication device may continue performing in block 306 in FIG. 3 by determining the next paging session.

Figure 6A:
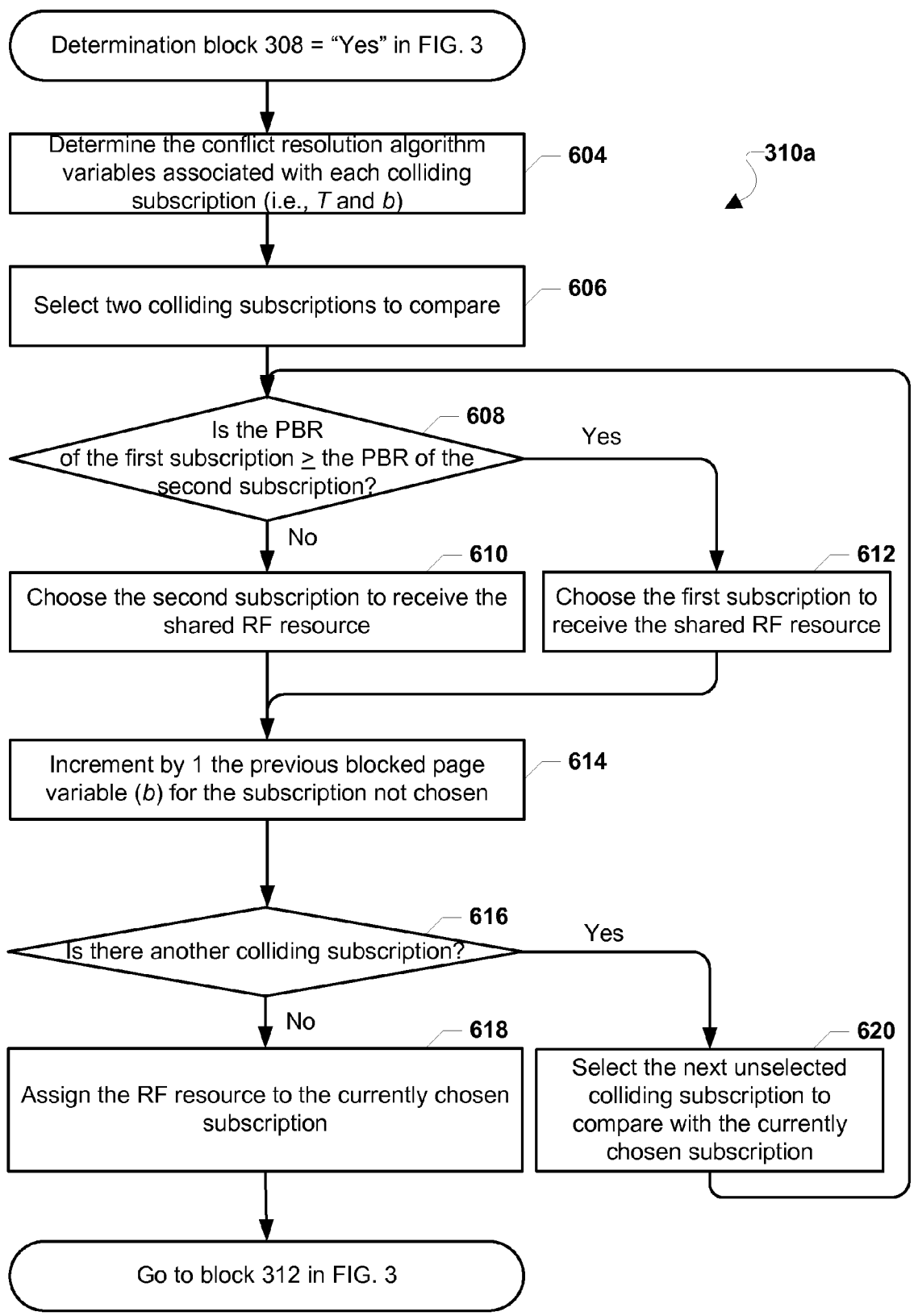
FIGS. 6A-6B are process flow diagrams illustrating embodiment methods for performing a conflict resolution algorithm based on the subscriptions paging block rates.

FIG. 6A illustrates an embodiment method 310a that may be implemented in an MSMS communication device for performing a conflict resolution algorithm to choose one or more subscriptions to receive access to a shared RF resource during the next paging session. In an embodiment, the MSMS communication device may perform collision arbitrations among two or more colliding subscriptions by comparing the colliding subscriptions. Method 310a may be an embodiment of the actions the MSMS communication device performs in block 310 in FIG. 3 when there are two or more subscriptions operating on the MSMS communication device but only one shared RF resource.

The MSMS communication device may begin the method 310a when it determines in determination block 308 in FIG. 3 that a paging collision will occur during the next paging session.

In block 604, the MSMS communication device may determine the conflict resolution algorithm variables associated with each colliding subscription. The colliding subscriptions may be those subscriptions anticipated to participate in a paging collision during the next paging session. In an embodiment, the MSMS communication device may recall each colliding subscription's b value and T variable.

In block 606, the MSMS communication device may select two colliding subscriptions. The MSMS communication device may select the two colliding subscriptions arbitrarily or based on various other criteria.

In determination block 608, the MSMS communication device may determine whether the first subscription's PBR value is greater than or equal to the second subscription's PBR value. If the first subscription's PBR value is greater than or equal to the second subscription's PBR value (i.e., determination block 608="Yes"), the MSMS communication device may choose the first subscription to receive the shared resource in block 612. The MSMS communication device may continue operating in block 614.

If the first subscription's PBR value is less than the PBR value of the second subscription (i.e., determination block 608="No"), the MSMS communication device may choose the second subscription to receive the shared RF resource in block 610. The MSMS communication device may also continue operating in block 614.

In block 614, the MSMS communication device may increment by one the previous blocked page variable (i.e., the b value) for the subscription that is not chosen. For example, if the first subscription is chosen to receive the shared RF resource, the MSMS communication device may increment the second subscription's b value by one. Likewise, the MSMS communication device may increment the first subscription's b value by one when the MSMS communication device selects the second subscription to receive the shared RF resource.

In determination block 616, the MSMS communication device may determine whether there is another colliding subscription. For example, the MSMS communication device may determine that paging messages for more than two subscriptions will arrive at the same time during the next paging session. In another example, the MSMS communication device may determine that paging messages for multiple subscriptions will be received sequentially (i.e., not at the same time, but close enough together to cause collisions).

If the MSMS communication device determines that there is another colliding subscription (i.e., determination block 616="Yes"), the MSMS communication device may select the next unselected colliding subscription to compare with the currently chosen subscription in block 620. For example, after choosing a subscription to receive the shared RF resource, the MSMS communication device may select a colliding subscription that has not been compared with another subscription to compare with the currently chosen subscription. The MSMS communication device may continue operating in determination block 608. In an embodiment, the MSMS communication device may compare each subscription with another subscription until every subscription has been compared and one subscription is ultimately chosen.

If the MSMS communication device determines that there is no other colliding subscription (i.e., determination block 616="No"), the MSMS communication device may assign the RF resource to the currently chosen subscription in block 618. The currently chosen subscription is the subscription that has the highest PBR value because, as a result of every comparison, the MSMS communication device chooses the subscription with the higher PBR value. Thus, after comparing every colliding subscription, the ultimately chosen subscription will have the highest PBR value.

The MSMS communication device may also continue operating by scheduling the one or more subscriptions determined to receive a shared RF resource to perform a wakeup before the next paging session in block 312 of method 300 as described above with reference to FIG. 3.

Figure 6B:
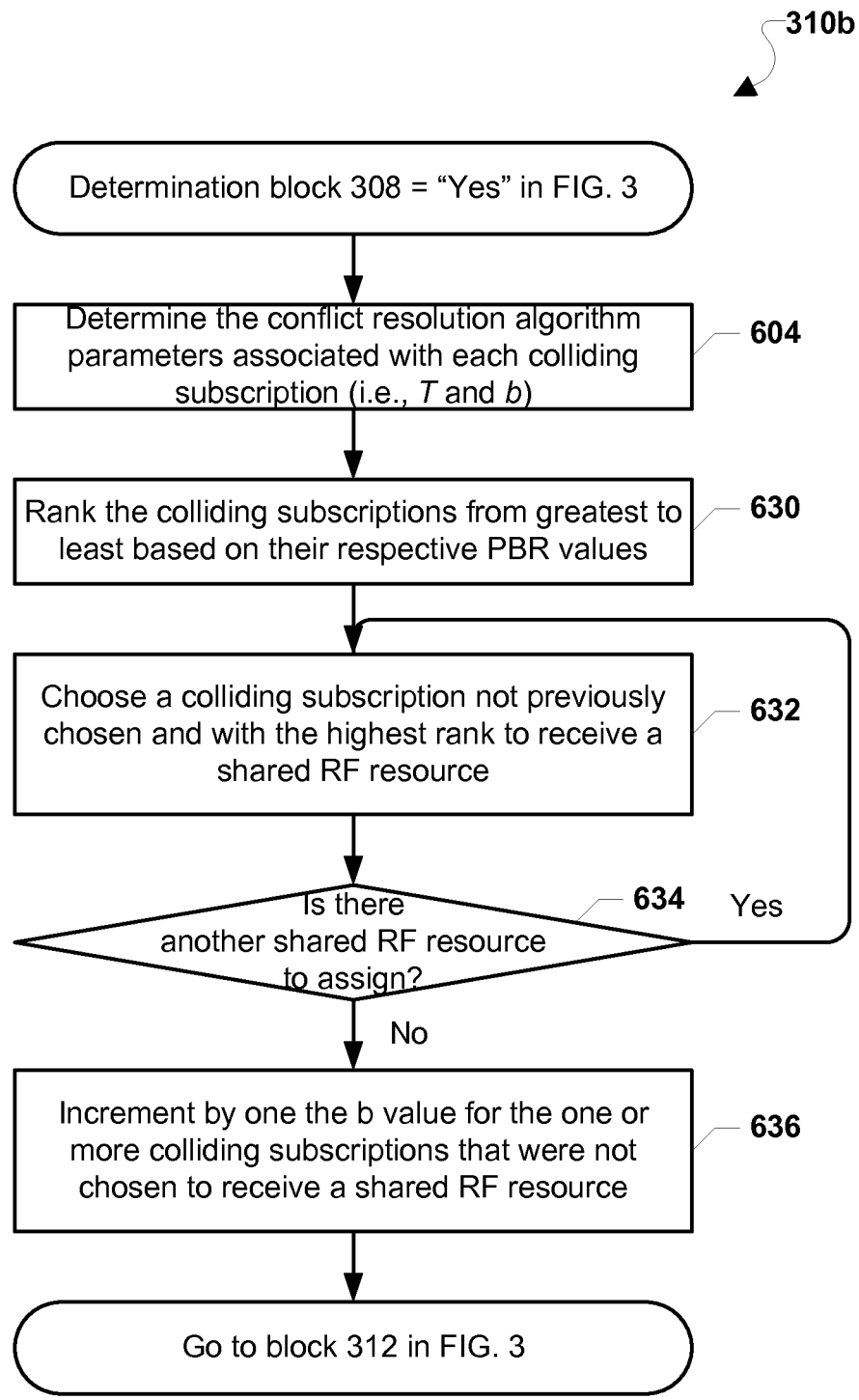

FIG. 6B illustrates an embodiment method 310b that may be implemented in an MSMS communication device for performing a conflict resolution algorithm when two or more subscriptions are predicted to simultaneously attempt to access one or more RF resources during the next paging session. Thus, method 310b may be an embodiment of the actions the MSMS communication device performs in block 310 in FIG. 3 when there are two or more subscriptions operating on the MSMS communication device and one or more shared RF resource. In other words, the MSMS communication device may perform method 310b when there are n colliding subscriptions and m shared RF resources, wherein n≥m. Thus, the MSMS communication device may perform method 310b when there is one shared RF resource or a plurality of shared RF resources.

The MSMS communication device may begin performing method 310b when a paging collision is predicted to occur during the next paging session (i.e., determination block 308 in method 300="Yes") and proceed as described above with reference to FIG. 3. In block 604, the MSMS communication device may determine the conflict resolution algorithm parameters associated with each colliding subscription. In an embodiment, the MSMS communication device may perform actions similar to those described above with reference to block 604 in FIG. 6A.

In block 630, the MSMS communication device may rank the colliding subscriptions from greatest to least based on their respective PBR values. In an embodiment, the MSMS communication device may calculate the PBR values for each subscription and then sort the subscriptions from the subscription with the highest PBR value to the subscription with the lowest PBR value.

In block 632, the MSMS communication device may choose a colliding subscription not previously chosen and with the highest rank to receive a shared RF resource. For example, the MSMS communication device may assign a shared RF resource to (i.e., choose) the colliding subscription with the highest rank and which has not been previously assigned to a shared RF resource.

The MSMS communication device may determine in determination block 634 whether there is another RF resource to assign. The MSMS communication device may include more than one RF resources that may be assigned to chosen subscriptions to conduct paging messages. If the MSMS communication device determines that there is an RF resource that has not been assigned to a colliding subscription (i.e., determination block 634="Yes"), the MSMS communication device may choose a colliding subscription not previously chosen and with the highest rank to receive that shared RF resource in block 632. The MSMS communication device may continue repeating these actions until it has assigned each of its shared RF resources to colliding subscriptions based on the subscriptions' ranks.

If the MSMS communication device determines that there is no other RF resource to assign (i.e., determination block 634="No"), the MSMS communication device in block 636 may increment the b value for the one or more colliding subscriptions that were not chosen to receive a shared RF resource. Thus, in an embodiment, the MSMS communication device may increment the b values for each subscription with PBR values less than the last subscription to be assigned an RF resource.

The MSMS communication device may continue operating in FIG. 3 by scheduling the subscriptions assigned a shared RF resource to perform a wakeup before the next paging session.

Figure 7A:
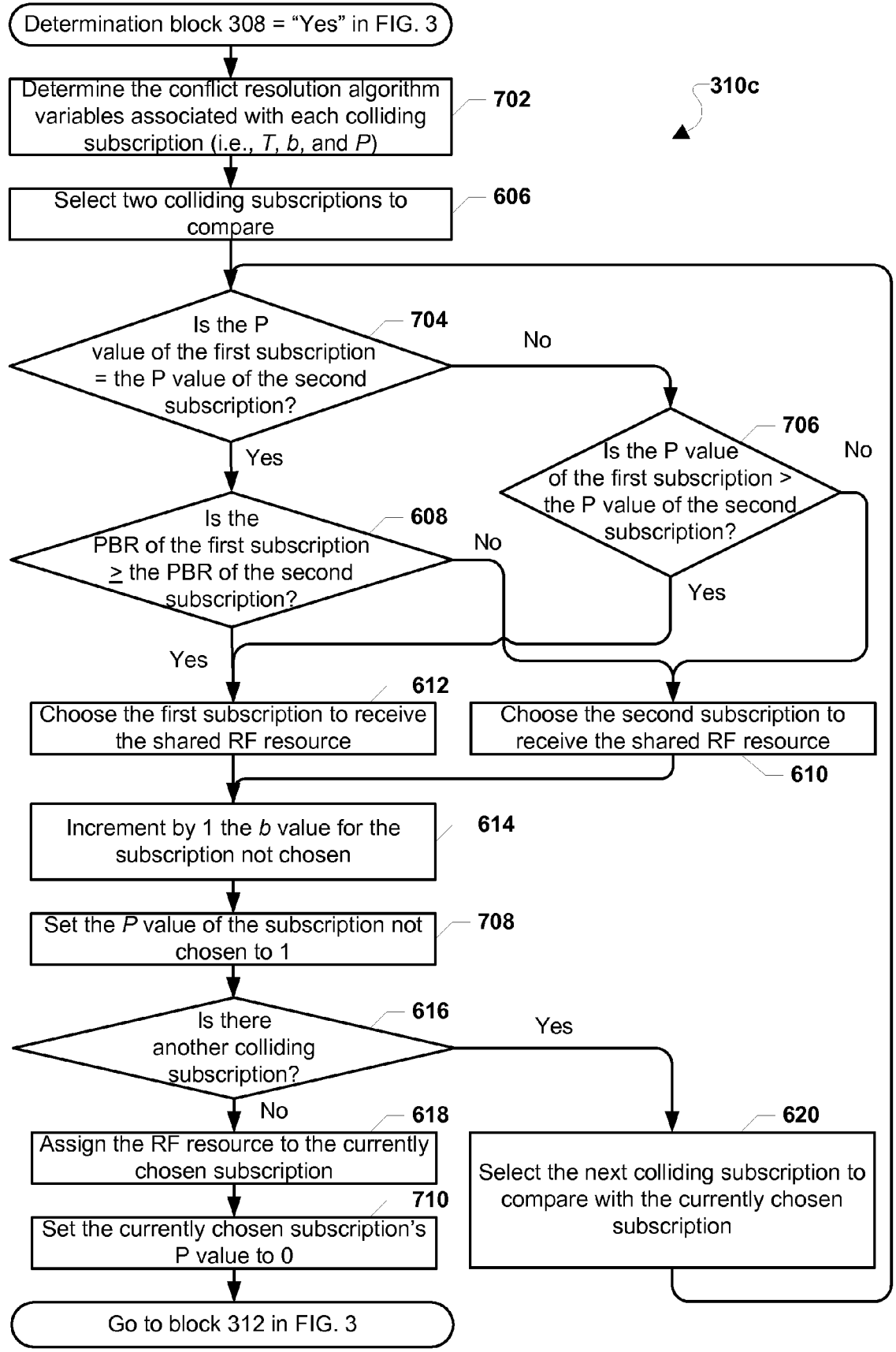
FIGS. 7A-7B are process flow diagrams illustrating other embodiment methods for performing a conflict resolution algorithm.

FIG. 7A illustrates another embodiment method 310c that may be implemented in an MSMS communication device for performing a conflict resolution algorithm when two or more subscriptions are simultaneously attempting to access one shared RF resource during a paging session. In various embodiments, method 310c may include actions the MSMS communication device performs in block 310 in FIG. 3 when there are two or more subscriptions operating on the MSMS communication device and only one shared RF resource. The MSMS communication device may begin method 310c when a paging collision is predicted to occur during the next paging session (i.e., determination block 308 in method 300="Yes") and proceed as described above with reference to FIG. 3.

In block 702, the MSMS communication device may determine the conflict resolution algorithm variables associated with each colliding subscription. The variables may include each subscription's DRX cycle length (i.e., T), number of blocked pages (i.e., b), and a priority value reflecting whether the subscription has been previously blocked (i.e., P). The MSMS communication device may also select two colliding subscriptions to compare in block 606.

In determination block 704, the MSMS communication device may determine whether the P value of a first subscription is equal to the P value of a second subscription. By comparing the two subscriptions' P values, the MSMS communication device may ensure that a subscription that had its last page message blocked will prevail over a subscription that received its last page message.

If the MSMS communication device determines that the P value of the first subscription is not equal to the P value of a second subscription (i.e., determination block 704="No"), the MSMS communication device may determine in determination block 706 whether the P value of the first subscription is greater than the P value of the second subscription. In an embodiment, the MSMS communication device may compare the subscriptions to determine which subscription of the two has a higher P value and, therefore, will be chosen to receive the shared RF resource. Accordingly, if the MSMS communication device determines that the first subscription's P value is greater than the second subscription's P value (i.e., determination block 706="Yes"), the MSMS communication device may choose the first subscription to receive the shared RF resource in block 612. Otherwise (i.e., determination block 706="No"), the MSMS communication device may choose the second subscription to receive the shared RF resource in block 610. The MSMS communication device may continue performing in block 614.

If the MSMS communication device determines that a first subscription's P value is equal to the P value of the second subscription (i.e., determination block 704="Yes"), the MSMS communication device may determine in determination block 608 whether the PBR of the first subscription is greater than or equal to the PBR value of the second subscription. In an embodiment, when the first and second subscription have equal P values, the MSMS communication device may perform comparisons similar to those described with reference to FIG. 6A. In other words, when the subscriptions' P values are equal, the MSMS communication device may choose between the subscriptions based on their PBR values.

If the first subscription's PBR value is greater than or equal to the PBR value of the second subscription (i.e., determination block 608="Yes"), the MSMS communication device may choose the first subscription to receive the shared RF resource in block 612. Otherwise (i.e., determination block 608="No"), the MSMS communication device may choose the second subscription to receive the shared RF resource in block 610. The MSMS communication device may continue performing in block 614.

In block 614, the MSMS communication device may increment by one the number of previously blocked pages (i.e. the b value) for the subscription not chosen. For example, if the MSMS communication device chooses the second subscription in block 610, the MSMS communication device may increment the first subscription's b value by one in block 614.

The MSMS communication device may also set the P value for the subscription not chosen to 1 in block 708. As described above, the MSMS communication device may give added priority to a subscription that had one or more of its last page messages blocked.

In determination block 616, the MSMS communication device may determine whether there is another colliding subscription as described above with reference to determination block 616 in FIG. 6A. For example, a paging collision may involve three or more subscriptions, and the MSMS communication device may compare each subscription to another subscription to determine which subscription will receive access to the shared RF resource. If there is another colliding subscription (i.e., determination block 616="Yes"), the MSMS communication device may select the next colliding subscription to compare with the currently chosen subscription in block 620. Thus, in an example, if the MSMS communication device chooses a first subscription over a second subscription, the MSMS communication device may compare the first subscription with a third subscription and may then choose one of the first and third subscriptions. The MSMS communication device may continue performing in determination block 704, which, in an embodiment, may begin another round of subscription comparisons.

However, if there is not another colliding subscription (i.e., determination block 616="No"), the MSMS communication device may assign the RF resource to the currently chosen subscription in block 618. In an embodiment, the MSMS communication device may assign the shared RF resource to the subscription which has the largest P value and the largest PBR value, which the MSMS communication device may have determined based on one or more comparisons between two or more subscriptions. The MSMS communication device may also set the currently chosen subscription's P value to zero in block 710. In an embodiment, the MSMS communication device may reset the currently chosen subscription's P value to a lower priority because its last paging attempt was successful.

The MSMS communication device may continue operating by scheduling the one or more subscriptions determined to receive a shared RF resource to perform a wakeup before the next paging session in block 312 of method 300 as described above with reference to FIG. 3.

Figure 7B:
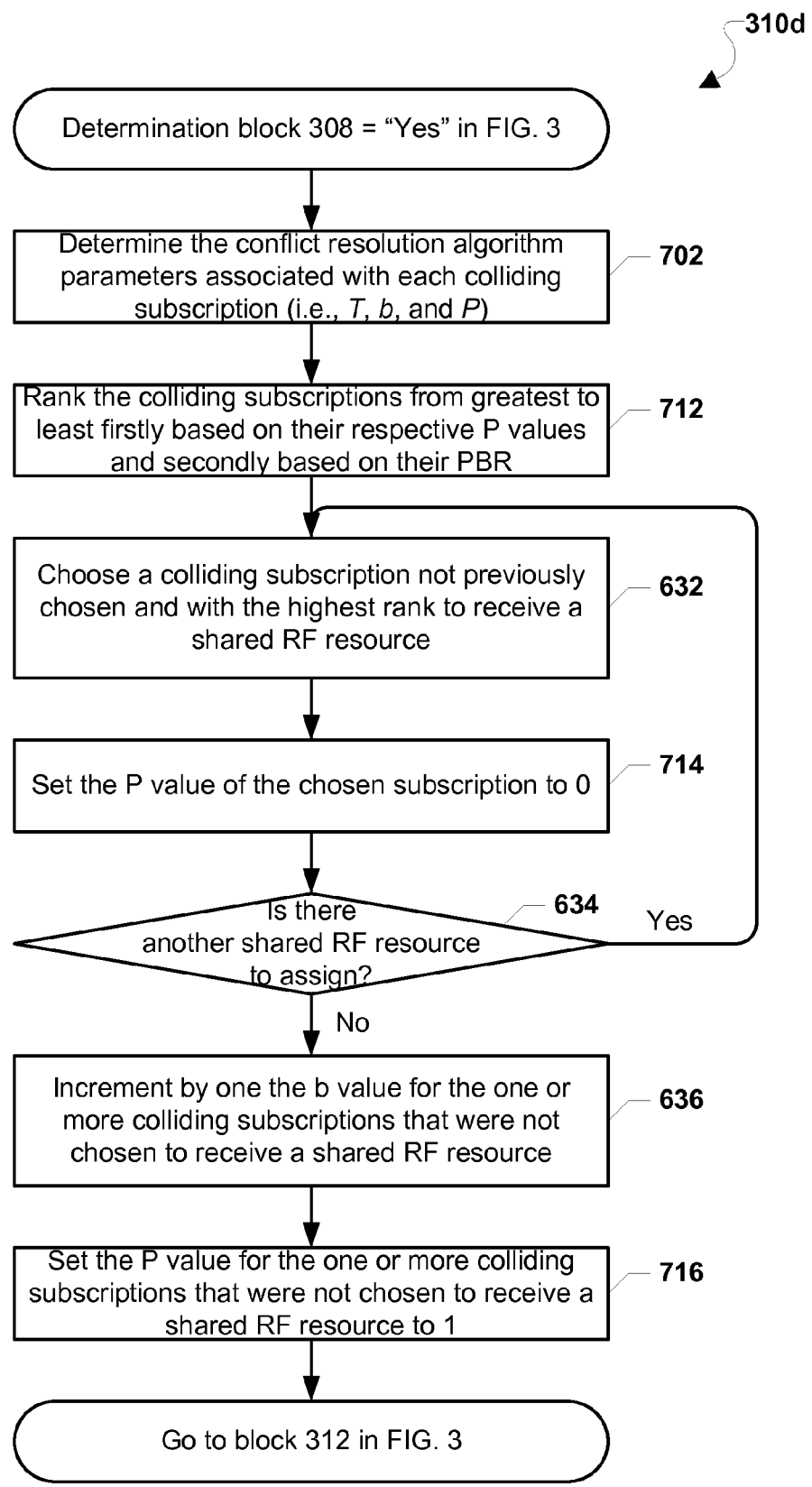

FIG. 7B illustrates another embodiment method 310d that may be implemented in an MSMS communication device for performing a conflict resolution algorithm when two or more subscriptions are simultaneously attempting to access one or more RF resources during a paging session. The MSMS communication device may perform method 310d as part of the actions performed in block 310 in FIG. 3 when there are two or more subscriptions operating on the MSMS communication device and one or more shared RF resources as described above with reference to FIG. 6B. The MSMS communication device may begin method 310d when a paging collision is predicted to occur during the next paging session (i.e., determination block 308 in method 300="Yes") and proceed as described above with reference to FIG. 3.

In block 702, the MSMS communication device may determine the conflict resolution algorithm variables associated with each colliding subscription as described above with relation to FIG. 7A. In an embodiment, these variables may include a subscription's DRX cycle length (T), number of previously blocked pages (b), and an indication of whether the subscription's last page was blocked (P).

In block 712, the MSMS communication device may rank the colliding subscriptions from greatest to least, based first on their respective P values and then based on their PBR. In an embodiment, the MSMS communication device may implement a two-staged sorting technique in which the MSMS communication device first sorts the subscriptions from greatest to least by their P values into groups of subscriptions with the same P value. The MSMS communication device may then sort these groups of subscriptions based on their PBR, from greatest to least. In an example, the highest ranking subscription will have the highest P value and highest PBR, while the lowest ranking subscription will have the lowest P value and lowest PBR. In another example, a particular subscription with P value of 1 and a PBR of 10 will be ranked higher than a subscription with a P value of 0 and a PBR of 100. However, that particular subscription will be ranked lower than another subscription with a P value of 1 and a PBR of 100. Also, in another embodiment, subscriptions that have the same P value and PBR will be ranked according to various tiebreaker algorithms.

In block 632, the MSMS communication device may choose a colliding subscription not previously chosen and with the highest rank to receive a shared RF resource. In an embodiment, once a subscription is assigned a shared RF resource, that subscription is removed from the ranking because it has already been chosen to receive a shared RF resource.

In block 714, the MSMS communication device may set the P value of the chosen subscription to zero. As discussed with reference to block 710 in FIG. 7A, the MSMS communication device may reset a subscription's P value when it is assigned an RF resource (i.e., when it is chosen to receive a shared RF resource).

In determination block 634, the MSMS communication device may determine whether there is another RF resource to assign. In an embodiment, the MSMS communication device may have more than one RF resource that may be utilized by more than one subscription during a paging session, and the MSMS communication device may assign a different subscription to each of RF resource. If there is another RF resource to assign (i.e., determination block 634="Yes"), the MSMS communication device may continue operating in block 632. In other words, the MSMS communication device may continue to choose subscriptions to receive shared RF resources based on the subscriptions' ranking until every RF resource has been assigned (i.e., determination block 634="No").

If no shared RF resources are left to assign (i.e., determination block 634="No"), the MSMS communication device may increment the b values by one for the one or more colliding subscriptions that were not chosen to receive a shared RF resource in block 636. The MSMS communication device may also set the P value to one for the one or more colliding subscriptions that were not chosen to receive a shared RF resource in block 716. Thus the MSMS communication device may update the variables of unsuccessful subscriptions to reflect the overall additional blocked page (i.e., b=b+1) and the fact that their last paging message was blocked (i.e., P=1).

The MSMS communication device may also continue operating by scheduling the one or more subscriptions chosen to receive a shared RF resource to perform a wakeup before the next paging session in block 312 of method 300 as described above with reference to FIG. 3.

Figure 8:
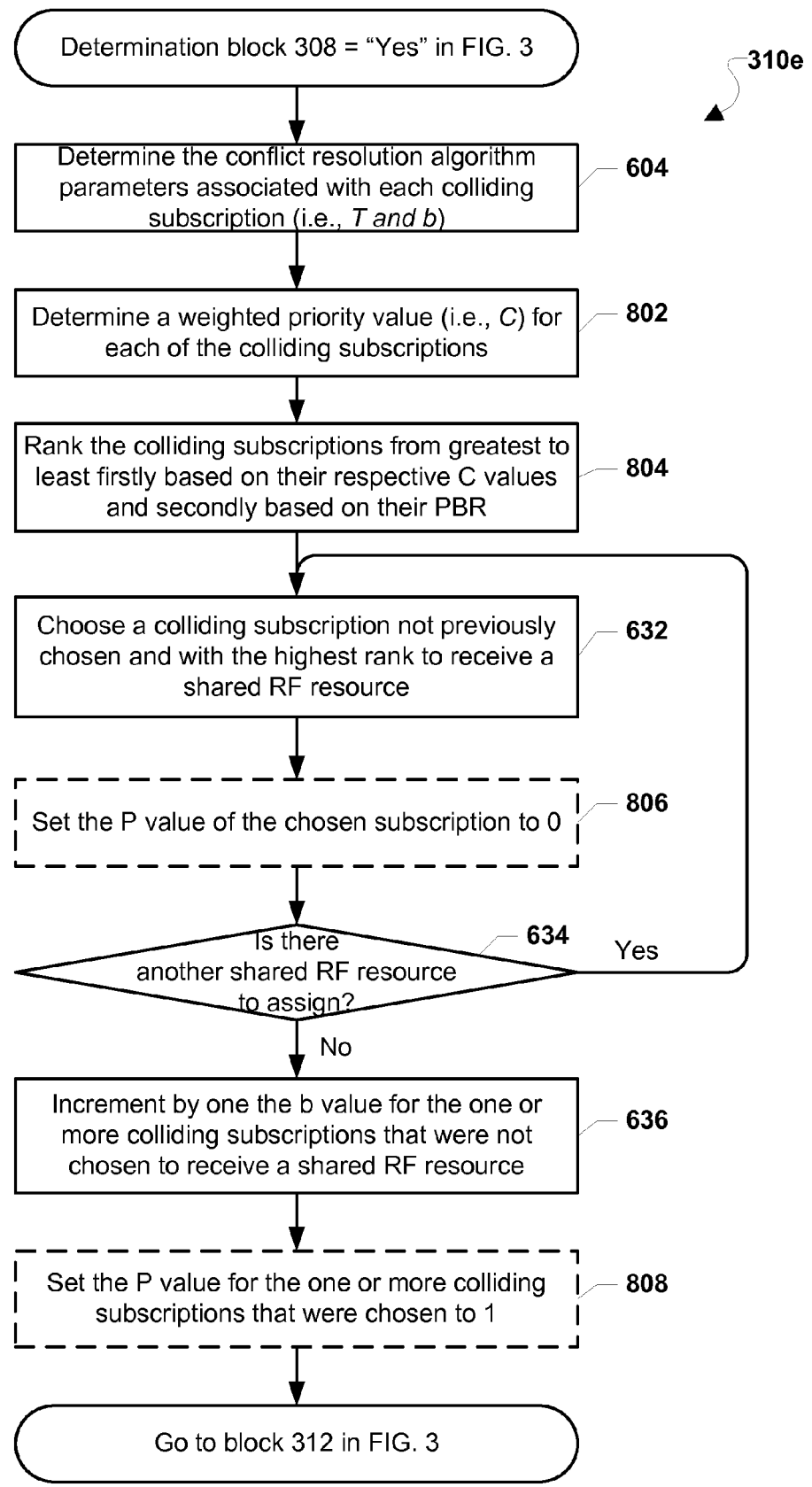
FIG. 8 is a process flow diagram illustrating an embodiment method for performing a conflict resolution algorithm using a weighted priority value.

FIG. 8 illustrates an embodiment method 310e that may be implemented in an MSMS communication device for performing a conflict resolution algorithm between two or more subscriptions based in part on the colliding subscriptions' weighted priority values. The MSMS communication device may perform method 310e as part of the actions performed in block 310 in FIG. 3 when there are two or more subscriptions operating on the MSMS communication device and one or more shared RF resources. The MSMS communication device may begin method 310e when a paging collision is predicted to occur during the next paging session (i.e., when determination block 308 of method 300="Yes") and proceed as described above with reference to FIG. 3.

In block 604, as discussed above with reference to block 604 in FIG. 6, the MSMS communication device may determine the conflict resolution algorithm parameters (i.e., T values and b values) associated with each of the colliding subscriptions.

In block 802, the MSMS communication device may determine a weighted priority value (i.e., a C value) for each of the colliding subscriptions. In an embodiment, the weighted priority value may be a sum of one or more weighted priority parameters values. For example, a colliding subscription's C value may be the sum of a first priority parameter multiplied by a first weight and a second priority parameter multiplied by a second weight (e.g., $C=(weight_1*parameter_1)+(weight_2*parameter_2)$).

The priority parameters may include various aspects useful in distinguishing one subscription from another. For example, the priority parameters may indicate a colliding subscription's channel quality, paging duration, probability of collision with another subscription, page-decode probability, and numerous other aspects of the subscription. In another embodiment, the priority parameters may include user-defined parameters, such as the user's preference for which subscription should have a higher priority (e.g., a higher priority for a "work" subscription versus a "home" subscription).

A priority parameter may have a corresponding weight that indicates the relative importance of that particular priority parameter. The weights associated with a particular parameter may be the same for each colliding subscription to enable the MSMS communication device to make direct comparisons of the colliding subscriptions.

In block 804, the MSMS communication device may rank the colliding subscriptions from greatest to least based first on their respective weighted priority values (i.e., C values) and secondly based on their PBR values. The MSMS communication device may perform operations similar to those described in block 712 in FIG. 7B. Thus, in an embodiment, the MSMS communication device may rank the colliding subscriptions based on their C values from greatest to least and then rank the subscriptions based on their PBR values. In block 632, the MSMS communication device may choose a colliding subscription not previously chosen and with the highest rank to receive a shared RF resource. For example, the MSMS communication device may assign the first shared RF resource to the colliding subscription that has the highest C value and the highest PBR value relative to the other colliding subscriptions. In an embodiment in which the weighted priority values includes a subscription's P value as described above with reference to FIGS. 6B and 7B, the MSMS communication device may set the P value of the chosen subscription to zero in optional block 806.

In determination block 634, the MSMS communication device may determine whether there is another RF resource to assign. If the MSMS communication device has not assigned all of the RF resources (i.e., determination block 634), the MSMS communication device may continue to assign shared RF resources to colliding subscriptions based on their rank in block 632. When the MSMS communication device has assigned all of the RF resources for the next paging session (i.e., determination block 634="No"), the MSMS communication device may increment by one the b value for the one or more colliding subscriptions that were not chosen to receive a shared RF resource in block 636.

In an embodiment in which a weighted priority value includes the priority value P as described above with reference to FIGS. 6B and 7B, the MSMS communication device may also set the priority value for the one or more colliding subscriptions that were not chosen to one in optional block 808. The MSMS communication device may also continue operating by scheduling the one or more subscriptions determined to receive a shared RF resource to perform a wakeup before the next paging session in block 312 of method 300 as described above with reference to FIG. 3.

Figure 9:
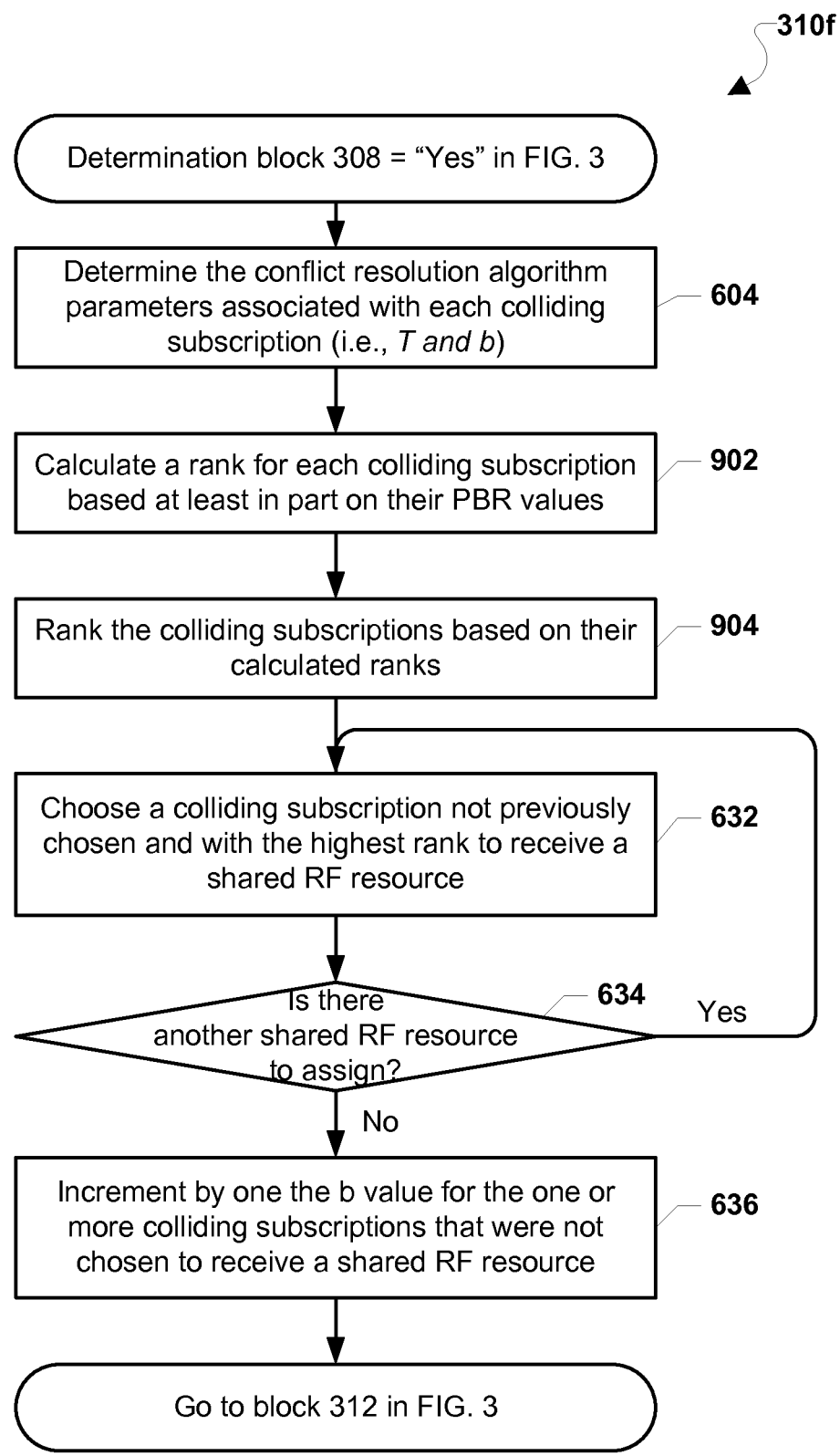
FIG. 9 is a process flow diagram illustrating an embodiment method for performing a conflict resolution algorithm using a calculated ranking system.

FIG. 9 illustrates an embodiment method 310f that may be implemented in an MSMS communication device for performing a conflict resolution algorithm based in part on ranking criteria. The MSMS communication device may perform method 310f as part of the actions performed in block 310 in FIG. 3 when there are two or more subscriptions operating on the MSMS communication device and one or more shared RF resources. The MSMS communication device may begin method 310f when a paging collision is predicted to occur during the next paging session (i.e., determination block 308 in method 300="Yes") and proceed as described above with reference to FIG. 3.

As discussed above with reference to FIG. 6, the MSMS communication device may determine the conflict resolution algorithm parameters associated with each colliding subscription in block 604.

In block 902, the MSMS communication device may calculate a rank for each colliding subscription based at least in part on the colliding subscriptions' PBR values. In an embodiment, the MSMS communication device may calculate a rank for the colliding subscriptions based on each colliding subscription's PBR value (i.e., T*b). In this embodiment, a higher PBR value is associated with a higher rank.

However, in other embodiments, the MSMS communication device may calculate the colliding subscriptions' respective ranks using various other metrics. In an embodiment, the MSMS communication device may first calculate the PBR values for the colliding subscriptions and then calculate the variance for the PBR values. In this embodiment, PBR values that are closer to the calculated variance value may have a higher rank than PBR values that are farther away. Similarly, in other embodiments, the MSMS communication device may also calculate ranks using the mean squared error, standard deviation, median, average, or other statistical metrics related to the colliding subscriptions' PBR values.

In block 904, the MSMS communication device may rank the colliding subscriptions based on their calculated ranks. For example, the MSMS communication device may rank the colliding subscriptions from the colliding subscription with the PBR value closest to the variance value to the colliding subscription with the PBR value farthest from the calculated variance value.

As described above with reference to FIG. 6A, the MSMS communication device may choose a colliding subscription not previously chosen and with the highest rank to receive a shared RF resource in block 632. The MSMS communication device may determine whether there is another shared RF resource to assign in determination block 634. The MSMS communication device may continue to assign shared RF resources to colliding subscriptions when there are still RF resources to assign (i.e., determination block 634="Yes"). When there are no more RF resources to assign (i.e., determination block 634="No"), the MSMS communication device may increment by one the b value for the one or more colliding subscription that were not chosen to receive a shared RF resource in block 636. The MSMS communication device may also continue operating by scheduling the one or more subscriptions determined to receive a shared RF resource to perform a wakeup before the next paging session in block 312 of method 300 as described above with reference to FIG. 3.

Figure 10:
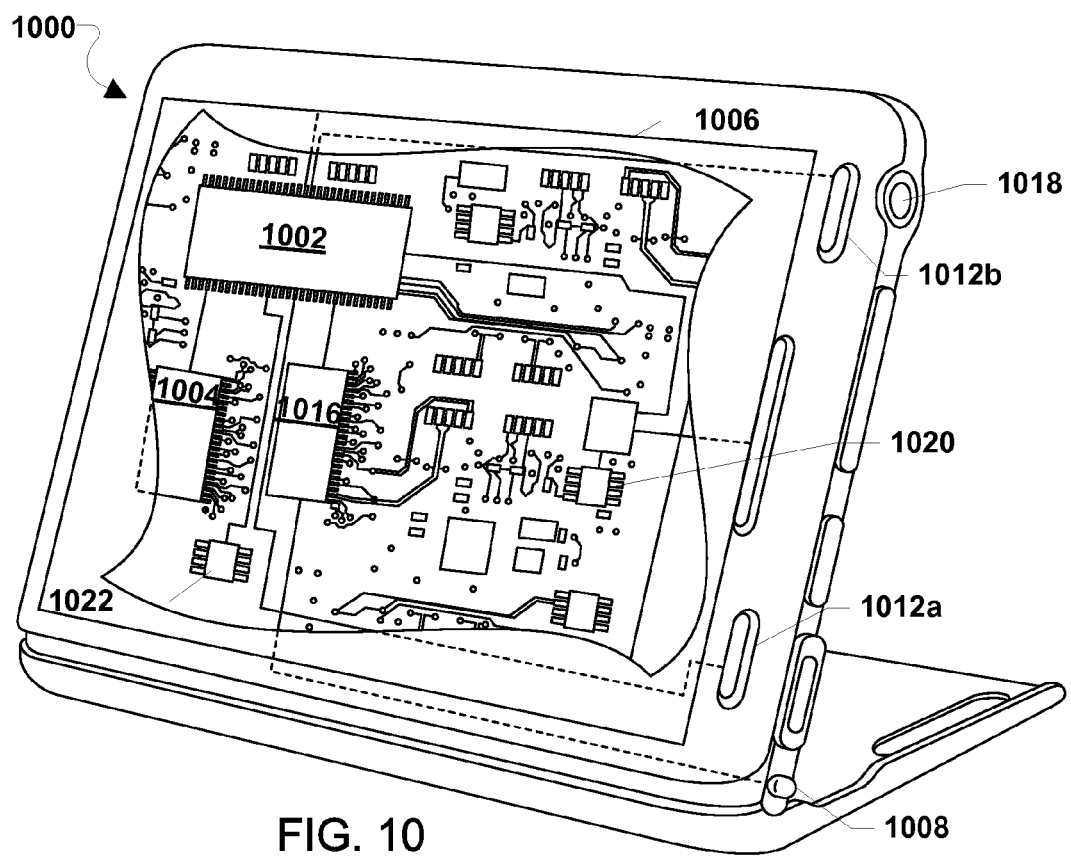
FIG. 10 is a block diagram of an example MSMS communication device according to an embodiment.

The various embodiments may be implemented in any of a variety of mobile communication devices, an example of which is illustrated in FIG. 10. For example, the mobile communication device 1000 may include a processor 1002 coupled to internal memory 1004. Internal memory 1004 may be volatile or non-volatile memory, and may also be secure and/or encrypted memory, or unsecure and/or unencrypted memory, or any combination thereof. The processor 1002 may also be coupled to a touch screen display 1006, such as a resistive-sensing touch screen, capacitive-sensing touch screen infrared sensing touch screen, or the like. Additionally, the display of the mobile communication device 1000 need not have touch screen capability. Additionally, the mobile communication device 1000 may have one or more antenna 1008 for sending and receiving electromagnetic radiation that may be connected to a wireless data link and/or cellular telephone transceiver 1016 coupled to the processor 1002. The mobile communication device 1000 may also include physical buttons 1012a and 1012b for receiving user inputs. The mobile communication device 1000 may also include a power button 1018 for turning the mobile communication device 1000 on and off. The mobile communication device 1000 may have a first SIM card 1020 and a second SIM card 1022 that utilize a cellular telephone transceiver 1016 and one or more antennae 1008 to connect to a first and a second mobile network, respectively. While not shown, the MSMS communication device may also have additional SIM cards that utilize one or more cellular telephone transceivers to respectively connect to additional mobile networks.

Figure 11:
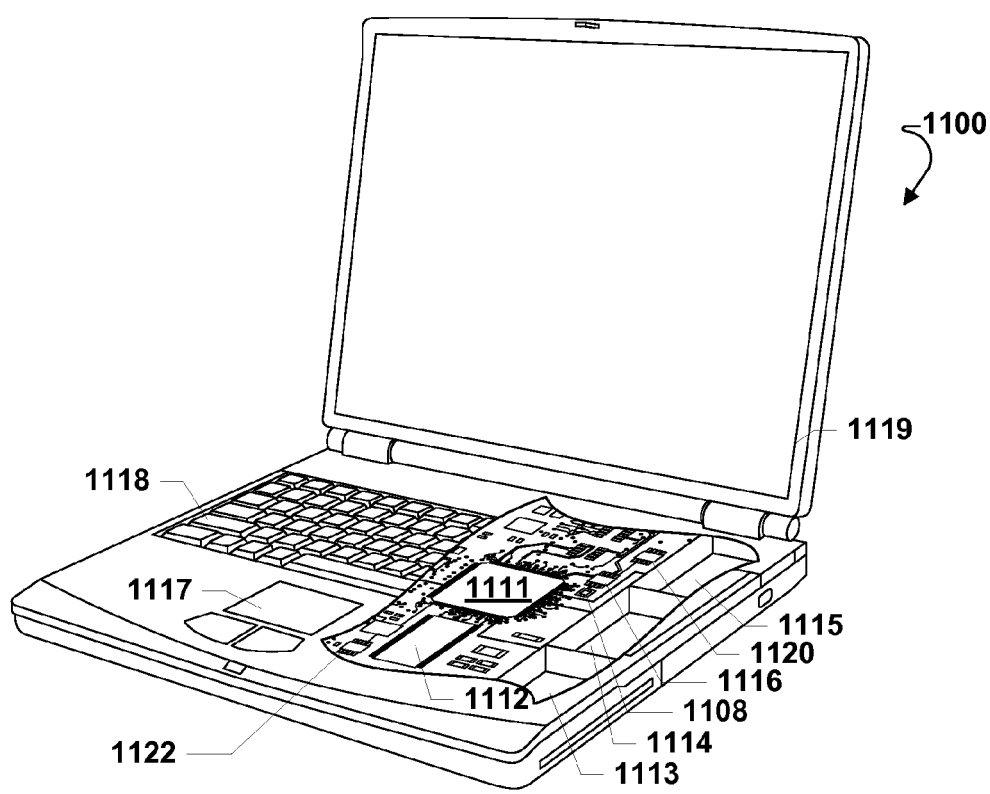
FIG. 11 is a block diagram of another example MSMS communication device according to an embodiment.

The various embodiments described above may also be implemented within a variety of mobile communication devices, such as a laptop computer 1100 illustrated in FIG. 11. Many laptop computers include a touchpad touch surface 1117 that serves as the computer's pointing device, and thus may receive drag, scroll, and flick gestures similar to those implemented on mobile computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the computing device may include a computer mouse or trackball coupled to the processor (e.g., via a USB input) as are well known, which may also be use in conjunction with the various embodiments. The computer 1100 may have a first SIM card 1120 and a second SIM card 1122 that utilize a cellular telephone transceiver 1116 and one or more antennae 1108 to connect to a first and a second mobile network, respectively. While not shown, the MSMS communication device may also have additional SIM cards that utilize one or more cellular telephone transceivers to respectively connect to additional mobile networks.

While the foregoing embodiments' descriptions addressed arbitrating predicted paging collisions during an upcoming paging session, the conflict resolution algorithm may be applied in other situations to fairly administer one or more shared resources among two or more entities that periodically compete for the shared resources. For example, a computing device may perform central processor unit (CPU) resource sharing in which two or more applications are periodically scheduled to have access to one or more processors/cores, with each application requiring a different amount of processing time. In this situation, the computing device may determine each application's processing period (i.e., a value analogous to a subscription's T value) and may maintain a count of the number of times the application does not gain access to the CPU resource when it is scheduled to do so (i.e., a value analogous to the subscription's b value). When two or more applications are scheduled to receive access to the one or more processors at the same time, the computing device may select the one or more applications that will receive access to the processors using the analogous T and b values as discussed above.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium (i.e., stored processor-executable software instructions). The steps of a method or algorithm disclosed herein may be embodied in a processor-executable software module and may be performed as processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of preemptively resolving paging collisions among a plurality of subscriptions operating on a multi-Subscriber Identity Module (SIM)-multi-standby communication device comprising a shared radio-frequency (RF) resource, comprising:
    initializing paging conflict resolution algorithm variables for each of the plurality of subscriptions;
    performing a conflict resolution algorithm based at least in part on paging block rate (PBR) values of multiple colliding subscriptions in the plurality of subscriptions to choose a particular subscription in the multiple colliding subscriptions to receive the shared RF resource, wherein the conflict resolution algorithm comprises:
        ranking the multiple colliding subscriptions based on the PBR values;
        choosing the particular subscription in the multiple colliding subscriptions to receive the shared RF resource based on the ranking of the multiple colliding subscriptions; and
        incrementing by one a blocked page variable (b) value for each of the multiple colliding subscriptions not chosen to receive the shared RF resource; and
    enabling a chosen subscription to receive the shared RF resource.

2. The method of claim 1, wherein the shared RF resource comprises a plurality of shared RF resources and wherein performing the conflict resolution algorithm and enabling the chosen subscription are performed for each of the plurality of shared RF resources experiencing paging collisions.

3. The method of claim 1, further comprising:
    determining whether a discontinuous reception (DRX) cycle length of any of the plurality of subscriptions has changed; and
    reinitializing the paging conflict resolution algorithm variables for each of the plurality of subscriptions when it is determined that the DRX cycle length of any of the plurality of subscriptions has changed.

4. The method of claim 1, wherein initializing paging conflict resolution algorithm variables for each of the plurality of subscriptions comprises:
    determining a discontinuous reception (DRX) cycle length for each of the plurality of subscriptions;
    setting a DRX variable (T) equal to the DRX cycle length for each of the plurality of subscriptions; and
    setting the blocked page variable (b) to 0 for each of the plurality of subscriptions.

5. The method of claim 4, further comprising setting a previous blocked page variable (P) to 0 for each of the plurality of subscriptions.

6. The method of claim 5, wherein performing the conflict resolution algorithm based at least in part on the PBR values of the multiple colliding subscriptions to choose the particular subscription in the multiple colliding subscriptions to receive the shared RF resource comprises:
    ranking the multiple colliding subscriptions based on the previous blocked page variable (P) values and the PBR values;
    setting the previous blocked page variable (P) value to one for each of the multiple colliding subscriptions not chosen to receive the shared RF resource; and
    setting the previous blocked page variable (P) value to zero for each of the multiple colliding subscriptions chosen to receive the shared RF resource.

7. The method of claim 4, wherein performing the conflict resolution algorithm based at least in part on the PBR values of the multiple colliding subscriptions to choose the particular subscription in the multiple colliding subscriptions to receive the shared RF resource comprises:

determining a weighted priority (C) value for each of the multiple colliding subscriptions;

ranking the multiple colliding subscriptions based on the weighted priority (C) values and the PBR values;

choosing the particular subscription in the multiple colliding subscriptions to receive the shared RF resource based on the ranking of the multiple colliding subscriptions; and incrementing by one the blocked page variable (b) value for each of the multiple colliding subscriptions not chosen to receive the shared RF resource.

8. The method of claim 7, further comprising:

setting a previous blocked page variable (P) value to one for each of the multiple colliding subscriptions not chosen to receive the shared RF resource; and setting the previous blocked page variable (P) value to zero for each of the multiple colliding subscriptions chosen to receive the shared RF resource, wherein initializing paging conflict resolution algorithm variables for each of the plurality of subscriptions further comprises setting the previous blocked page variable (P) to 0 for each of the plurality of subscriptions.

9. The method of claim 1, wherein ranking the multiple colliding subscriptions based on the PBR values comprises:

calculating a rank for each of the multiple colliding subscriptions based at least in part on the PBR values; and ranking the multiple colliding subscriptions based on their calculated ranks.

10. The method of claim 1, wherein the multiple colliding subscriptions are ranked based on how close the PBR values are to a calculated variance value of the multiple colliding subscriptions PBR values.

11. A multi-Subscriber Identity Module (SIM)-multi-standby communication device, comprising:

a shared radio-frequency (RF) resource; and a processor coupled to the shared RF resource, wherein the processor is configured with processor-executable instructions to:

initialize paging conflict resolution algorithm variables for each of a plurality of subscriptions;

perform a conflict resolution algorithm based at least in part on paging block rate (PBR) values of multiple colliding subscriptions in the plurality of subscriptions to choose a particular subscription in the multiple colliding subscriptions to receive the shared RF resource, wherein the conflict resolution algorithm comprises:

ranking the multiple colliding subscriptions based on the PBR values;

choosing the particular subscription in the multiple colliding subscriptions to receive the shared RF resource based on the ranking of the multiple colliding subscriptions; and incrementing by one a blocked page variable (b) value for each of the multiple colliding subscriptions not chosen to receive the shared RF resource; and enabling a chosen subscription to receive the shared RF resource.

12. The multi-SIM-multi-standby communication device of claim 11, wherein the processor is configured with processor-executable instructions to perform operations such that the shared RF resource comprises a plurality of shared RF resources and such that performing the conflict resolution algorithm and enabling the chosen subscription are performed for each of the plurality of shared RF resources experiencing paging collisions.

13. The multi-SIM-multi-standby communication device of claim 11, wherein the processor is further configured with processor-executable instructions to:

determine whether a discontinuous reception (DRX) cycle length of any of the plurality of subscriptions has changed; and reinitialize the paging conflict resolution algorithm variables for each of the plurality of subscriptions when it is determined that the DRX cycle length of any of the plurality of subscriptions has changed.

14. The multi-SIM-multi-standby communication device of claim 11, wherein the processor is further configured with processor-executable instructions to initialize paging conflict resolution algorithm variables for each of the plurality of subscriptions by:

determining a discontinuous reception (DRX) cycle length for each of the plurality of subscriptions;

setting a DRX variable (T) equal to the DRX cycle length for each of the plurality of subscriptions; and setting the blocked page variable (b) to 0 for each of the plurality of subscriptions.

15. The multi-SIM-multi-standby communication device of claim 14, wherein the processor is further configured with processor-executable instructions to set a previous blocked page variable (P) to 0 for each of the plurality of subscriptions.

16. The multi-SIM-multi-standby communication device of claim 15, wherein the processor is configured with processor-executable instructions to perform the conflict resolution algorithm based at least in part on the PBR values of the multiple colliding subscriptions to choose the particular subscription in the multiple colliding subscriptions to receive the shared RF resource by:

ranking the multiple colliding subscriptions based on the previous blocked page variable (P) values and the PBR values;

setting the previous blocked page variable (P) value to one for each of the multiple colliding subscriptions not chosen to receive the shared RF resource; and setting the previous blocked page variable (P) value to zero for each of the multiple colliding subscriptions chosen to receive the shared RF resource.

17. The multi-SIM-multi-standby communication device of claim 14, wherein the processor is configured with processor-executable instructions to perform the conflict resolution algorithm based at least in part on the PBR values of the multiple colliding subscriptions to choose the particular subscription in the multiple colliding subscriptions to receive the shared RF resource by:

determining a weighted priority (C) value for each of the multiple colliding subscriptions;

ranking the multiple colliding subscriptions based on the weighted priority (C) values and the PBR values;

choosing the particular subscription in the multiple colliding subscriptions to receive the shared RF resource based on the ranking of the multiple colliding subscriptions; and incrementing by one the blocked page variable (b) value for each of the multiple colliding subscriptions not chosen to receive the shared RF resource.

18. The multi-SIM-multi-standby communication device of claim 17, wherein the processor is further configured with processor-executable instructions to:

set a previous blocked page variable (P) value to one for each of the multiple colliding subscriptions not chosen to receive the shared RF resource; and set the previous blocked page variable (P) value to zero for each of the multiple colliding subscriptions chosen to receive the shared RF resource, and wherein the processor is further configured with processor-executable instructions to initialize paging conflict resolution algorithm variables for each of the plurality of subscriptions further by setting the previous blocked page variable (P) to 0 for each of the plurality of subscriptions.

19. The multi-SIM-multi-standby communication device of claim 11, wherein the processor is further configured with processor-executable instructions to rank the multiple colliding subscriptions based on the PBR values by:

calculating a rank for each of the multiple colliding subscriptions based at least in part on the PBR values; and
ranking the multiple colliding subscriptions based on their calculated ranks.

20. The multi-SIM-multi-standby communication device of claim 11, wherein the processor is configured with processor-executable instructions to perform operations such that the multiple colliding subscriptions are ranked based on how close the PBR values are to a calculated variance value of the multiple colliding subscriptions PBR values.

21. A multi-Subscriber Identity Module (SIM)-multi-standby communication device, comprising:

means for initializing paging conflict resolution algorithm variables for each of a plurality of subscriptions;

means for performing a conflict resolution algorithm based at least in part on paging block rate (PBR) values of multiple colliding subscriptions in the plurality of subscriptions to choose a particular subscription in the multiple colliding subscriptions to receive a shared radio-frequency (RF) resource, wherein the means for performing the conflict resolution algorithm comprises:

means for ranking the multiple colliding subscriptions based on the PBR values;

means for choosing the particular subscription in the multiple colliding subscriptions to receive the shared RF resource based on the ranking of the multiple colliding subscriptions; and means for incrementing by one a blocked page variable (b) value for each of the multiple colliding subscriptions not chosen to receive the shared RF resource; and means for enabling a chosen subscription to receive the shared RF resource.

22. The multi-SIM-multi-standby communication device of claim 21, wherein the shared RF resource comprises a plurality of shared RF resources and wherein performing the conflict resolution algorithm and enabling the chosen subscription are performed for each of the plurality of shared RF resources experiencing paging collisions.

23. The multi-SIM-multi-standby communication device of claim 21, further comprising:

means for determining whether a discontinuous reception (DRX) cycle length of any of the plurality of subscriptions has changed; and means for reinitializing the paging conflict resolution algorithm variables for each of the plurality of subscriptions when it is determined that the DRX cycle length of any of the plurality of subscriptions has changed.

24. The multi-SIM-multi-standby communication device of claim 21, wherein means for initializing paging conflict resolution algorithm variables for each of the plurality of subscriptions comprises:

means for determining a discontinuous reception (DRX) cycle length for each of the plurality of subscriptions;

means for setting a DRX variable (T) equal to the DRX cycle length for each of the plurality of subscriptions; and means for setting the blocked page variable (b) to 0 for each of the plurality of subscriptions.

25. The multi-SIM-multi-standby communication device of claim 24, further comprising means for setting a previous blocked page variable (P) to 0 for each of the plurality of subscriptions.

26. The multi-SIM-multi-standby communication device of claim 25, wherein means for performing the conflict resolution algorithm based at least in part on the PBR values of the multiple colliding subscriptions to choose the particular subscription in the multiple colliding subscriptions to receive the shared RF resource comprises:

means for ranking the multiple colliding subscriptions based on the previous blocked page variable (P) values and the PBR values;

means for setting the previous blocked page variable (P) value to one for each of the multiple colliding subscriptions not chosen to receive the shared RF resource; and means for setting the previous blocked page variable (P) value to zero for each of the multiple colliding subscriptions chosen to receive the shared RF resource.

27. The multi-SIM-multi-standby communication device of claim 24, wherein means for performing the conflict resolution algorithm based at least in part on the PBR values of the multiple colliding subscriptions to choose the particular subscription in the multiple colliding subscriptions to receive the shared RF resource comprises:

means for determining a weighted priority (C) value for each of the multiple colliding subscriptions;

means for ranking the multiple colliding subscriptions based on the weighted priority (C) values and the PBR values;

means for choosing the particular subscription in the multiple colliding subscriptions to receive the shared RF resource based on the ranking of the multiple colliding subscriptions; and means for incrementing by one the block page variable (b) value for each of the multiple colliding subscriptions not chosen to receive the shared RF resource.

28. The multi-SIM-multi-standby communication device of claim 27, further comprising:

means for setting a previous blocked page variable (P) value to one for each of the multiple colliding subscriptions not chosen to receive the shared RF resource; and means for setting the previous blocked page variable (P) value to zero for each of the multiple colliding subscriptions chosen to receive the shared RF resource, wherein means for initializing paging conflict resolution algorithm variables for each of the plurality of subscriptions further comprises means for setting the previous blocked page variable (P) to 0 for each of the plurality of subscriptions.

29. The multi-SIM-multi-standby communication device of claim 21, wherein means for ranking the multiple colliding subscriptions based on the PBR values comprises:

means for calculating a rank for each of the multiple colliding subscriptions based at least in part on the PBR values; and means for ranking the multiple colliding subscriptions based on their calculated ranks.

30. The multi-SIM-multi-standby communication device of claim 21, wherein the multiple colliding subscriptions are ranked based on how close the PBR values are to a calculated variance value of the multiple colliding subscriptions PBR values.

31. A non-transitory processor-readable storage medium having stored thereon processor-executable software instructions configured to cause a processor of a multi-Subscriber Identity Module (SIM)-multi-standby communication device to perform operations comprising:
   initializing paging conflict resolution algorithm variables for each of a plurality of subscriptions;
   performing a conflict resolution algorithm based at least in part on paging block rate (PBR) values of multiple colliding subscriptions in the plurality of subscriptions to choose a particular subscription in the multiple colliding subscriptions to receive a shared radio-frequency (RF) resource, wherein the conflict resolution algorithm comprises:
      ranking the multiple colliding subscriptions based on the PBR values;
      choosing the particular subscription in the multiple colliding subscriptions to receive the shared RF resource based on the ranking of the multiple colliding subscriptions; and
      incrementing by one a blocked page variable (b) value for each of the multiple colliding subscriptions not chosen to receive the shared RF resource; and
   enabling a chosen subscription to receive the shared RF resource.

32. The non-transitory processor-readable storage medium of claim 31, wherein the stored processor-executable software instructions are configured to cause a processor of a multi-SIM-multi-standby communication device to perform operations such that the shared RF resource comprises a plurality of shared RF resources and such that performing the conflict resolution algorithm and enabling the chosen subscription are performed for each of the plurality of shared RF resources experiencing paging collisions.

33. The non-transitory processor-readable storage medium of claim 31, wherein the stored processor-executable software instructions are configured to cause a processor of a multi-SIM-multi-standby communication device to perform operations further comprising:
   determining whether a discontinuous reception (DRX) cycle length of any of the plurality of subscriptions has changed; and
   reinitializing the paging conflict resolution algorithm variables for each of the plurality of subscriptions when it is determined that the DRX cycle length of any of the plurality of subscriptions has changed.

34. The non-transitory processor-readable storage medium of claim 31, wherein the stored processor-executable software instructions are configured to cause a processor of a multi-SIM-multi-standby communication device to perform operations such that initializing paging conflict resolution algorithm variables for each of the plurality of subscriptions comprises:
   determining a discontinuous reception (DRX) cycle length for each of the plurality of subscriptions;
   setting a DRX variable (T) equal to the DRX cycle length for each of the plurality of subscriptions; and
   setting the blocked page variable (b) to 0 for each of the plurality of subscriptions.

35. The non-transitory processor-readable storage medium of claim 34, wherein the stored processor-executable software instructions are configured to cause a processor of a multi-SIM-multi-standby communication device to perform operations further comprising setting a previous blocked page variable (P) to 0 for each of the plurality of subscriptions.

36. The non-transitory processor-readable storage medium of claim 35, wherein the stored processor-executable software instructions are configured to cause a processor of a multi-SIM-multi-standby communication device to perform operations such that performing the conflict resolution algorithm based at least in part on the PBR values of the multiple colliding subscriptions to choose the particular subscription in the multiple colliding subscriptions to receive the shared RF resource comprises:
   ranking the multiple colliding subscriptions based on the previous blocked page variable (P) values and the PBR values;
   setting the previous blocked page variable (P) value to one for each of the multiple colliding subscriptions not chosen to receive the shared RF resource; and
   setting the previous blocked page variable (P) value to zero for each of the multiple colliding subscriptions chosen to receive the shared RF resource.

37. The non-transitory processor-readable storage medium of claim 31, wherein the stored processor-executable software instructions are configured to cause a processor of a multi-SIM-multi-standby communication device to perform operations such that performing the conflict resolution algorithm based at least in part on the PBR values of the multiple colliding subscriptions to choose the particular subscription in the multiple colliding subscriptions to receive the shared RF resource comprises:
   determining a weighted priority (C) value for each of the multiple colliding subscriptions;
   ranking the multiple colliding subscriptions based on the weighted priority (C) values and the PBR values;
   choosing the particular subscription in the multiple colliding subscriptions to receive the shared RF resource based on the ranking of the multiple colliding subscriptions; and
   incrementing by one the blocked page variable (b) value for each of the multiple colliding subscriptions not chosen to receive the shared RF resource.

38. The non-transitory processor-readable storage medium of claim 37, wherein the stored processor-executable software instructions are configured to cause a processor of a multi-SIM-multi-standby communication device to perform operations further comprising:
   setting a previous blocked page variable (P) value to one for each of the multiple colliding subscriptions not chosen to receive the shared RF resource; and
   setting the previous blocked page variable (P) value to zero for each of the multiple colliding subscriptions chosen to receive the shared RF resource, and
   wherein the stored processor-executable software instructions are configured to cause a processor of a multi-SIM-multi-standby communication device to perform operations such that initializing paging conflict resolution algorithm variables for each of the plurality of subscriptions further comprises setting the previous blocked page variable (P) to 0 for each of the plurality of subscriptions.

39. The non-transitory processor-readable storage medium of claim 31, wherein the stored processor-executable software instructions are configured to cause a processor of a multi-SIM-multi-standby communication device to perform operations such that ranking the multiple colliding subscriptions based on the PBR values comprises:

calculating a rank for each of the multiple colliding subscriptions based at least in part on the PBR values; and
ranking the multiple colliding subscriptions based on their calculated ranks.

40. The non-transitory processor-readable storage medium of claim 31, wherein the stored processor-executable software instructions are configured to cause a processor of a multi-SIM-multi-standby communication device to perform operations such that the multiple colliding subscriptions are ranked based on how close the PBR values are to a calculated variance value of the multiple colliding subscriptions PBR values.

\* \* \* \* \*